United States Patent
Nakasuji

(10) Patent No.: US 11,470,295 B2
(45) Date of Patent: Oct. 11, 2022

(54) SIGNAL PROCESSING DEVICE, SIGNAL PROCESSING METHOD, AND IMAGING DEVICE

(71) Applicant: SONY CORPORATION, Tokyo (JP)

(72) Inventor: Motohiro Nakasuji, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 111 days.

(21) Appl. No.: 16/970,489

(22) PCT Filed: Dec. 4, 2018

(86) PCT No.: PCT/JP2018/044523
§ 371 (c)(1),
(2) Date: Aug. 17, 2020

(87) PCT Pub. No.: WO2019/163250
PCT Pub. Date: Aug. 29, 2019

(65) Prior Publication Data
US 2021/0084273 A1 Mar. 18, 2021

(30) Foreign Application Priority Data
Feb. 26, 2018 (JP) .............................. JP2018-031712

(51) Int. Cl.
*H04N 9/73* (2006.01)
*G09G 5/02* (2006.01)
*H04N 9/07* (2006.01)

(52) U.S. Cl.
CPC ............... *H04N 9/735* (2013.01); *G09G 5/02* (2013.01); *H04N 9/07* (2013.01)

(58) Field of Classification Search
CPC ........... H04N 9/735; H04N 9/07; H04N 9/73; H04N 9/64; G09G 5/02
See application file for complete search history.

(56) References Cited

U.S. PATENT DOCUMENTS 7,884,866 B2 * 2/2011 Yamada .................. G06T 5/009
   348/280
9,652,687 B2 * 5/2017 Sato ........................ H04N 9/735
   (Continued)

FOREIGN PATENT DOCUMENTS

CN   104869380 A   8/2015
JP   2005-117420 A   4/2005
   (Continued)

OTHER PUBLICATIONS

International Search Report and Written Opinion of PCT Application No. PCT/JP2018/044523, dated Jan. 29, 2019, 10 pages of ISRWO.

(Continued)

*Primary Examiner* — Bryan Earles
(74) *Attorney, Agent, or Firm* — Chip Law Group

(57) ABSTRACT

An input signal for each of three primary color components is converted into a luminance signal and a color signal by a color space conversion part. A gain setting part sets a gain for the color signal obtained by color space conversion according to a signal level of a setting reference signal generated on the basis of the input signal, for example, the luminance signal. A gain adjustment part performs gain adjustment of the color signal with the gain set by the gain setting part, and in a case where the luminance signal is larger than a threshold set according to a dynamic range for each color component, the gain adjustment part makes the subject achromatic so that, even in a case where a light amount of the subject is high, influence of a difference in the dynamic range is little.

17 Claims, 15 Drawing Sheets

(56) References Cited

U.S. PATENT DOCUMENTS

| | | |
|---|---|---|
| 2010/0097482 A1 | 4/2010 | Kuniba |
| 2010/0208097 A1 | 8/2010 | Tanabe |
| 2011/0234622 A1 | 9/2011 | Fujita et al. |
| 2015/0245000 A1 | 8/2015 | Sato |

FOREIGN PATENT DOCUMENTS

| | | |
|---|---|---|
| JP | 2006-148607 A | 6/2006 |
| JP | 2007-219792 A | 8/2007 |
| JP | 2008-244588 A | 10/2008 |
| JP | 4461765 B2 | 5/2010 |
| JP | 4980132 B2 | 7/2012 |
| JP | 6415062 B2 | 10/2018 |
| WO | 2002/003711 A1 | 1/2002 |
| WO | 2008/117818 A1 | 10/2008 |
| WO | 2008/139769 A1 | 11/2008 |
| WO | 2010/067488 A1 | 6/2010 |

OTHER PUBLICATIONS

Extended European Search Report of EP Application No. 18907313.3, dated Dec. 21, 2020, 07 pages.

\* cited by examiner

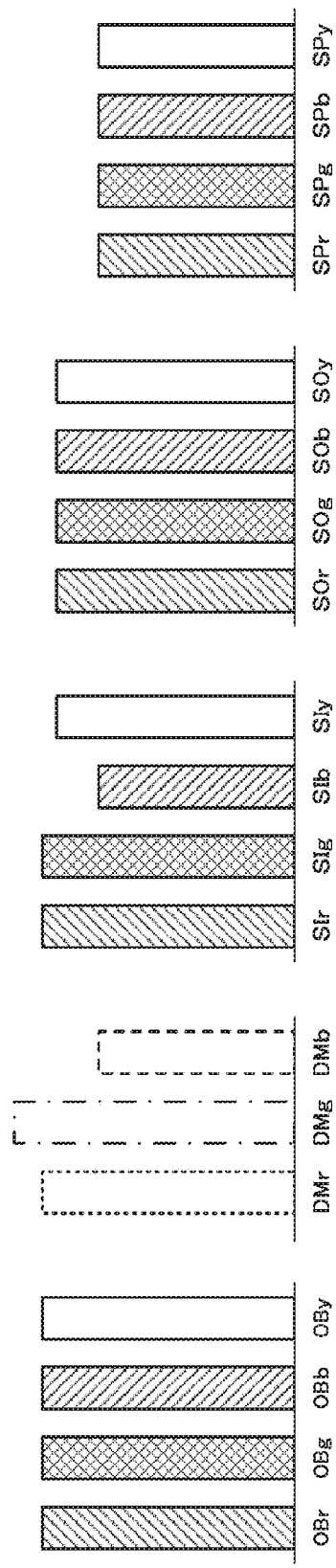

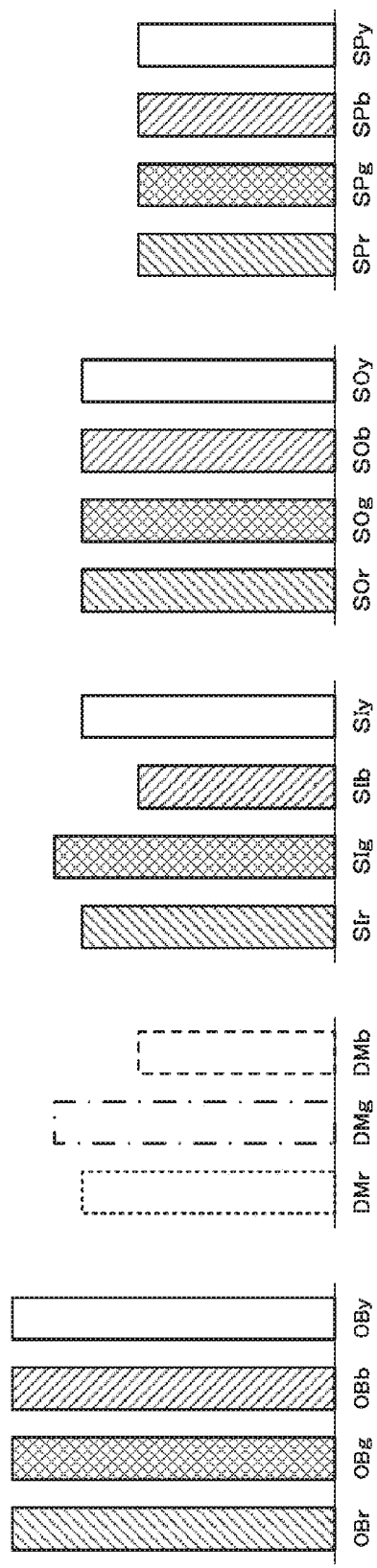

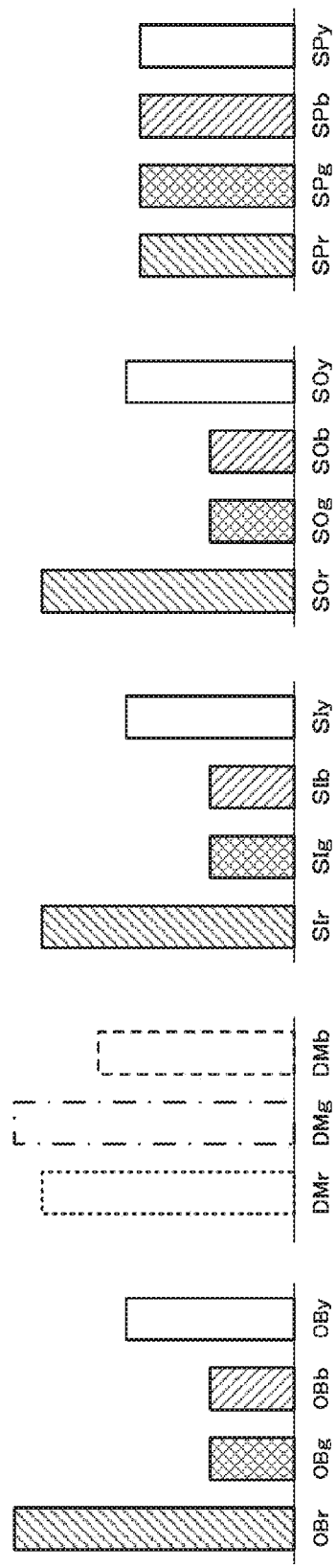

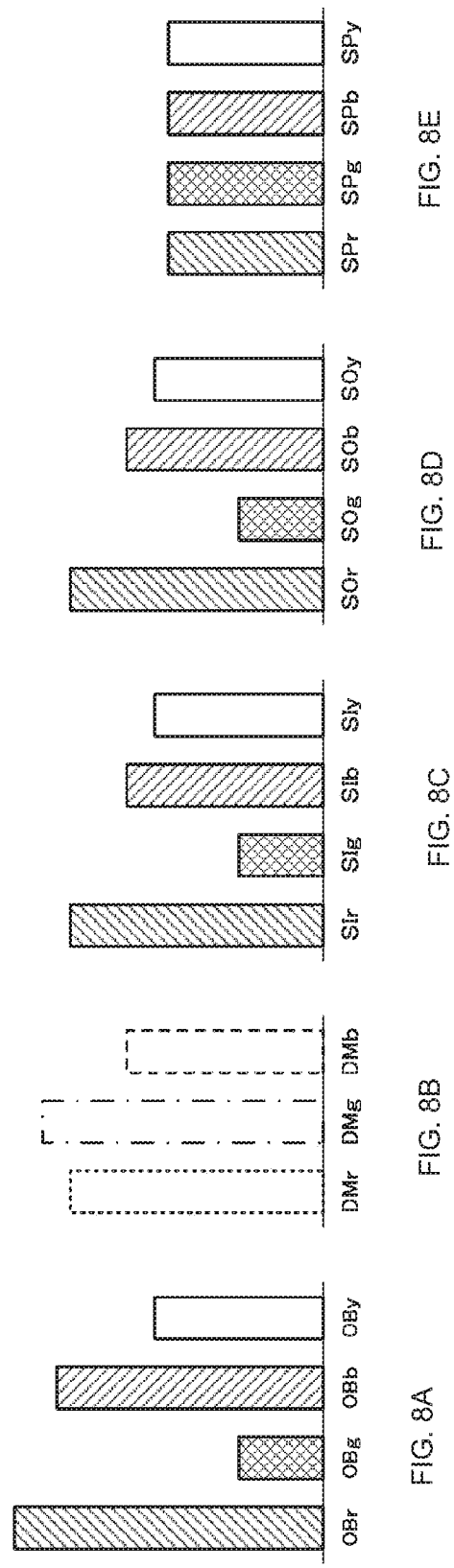

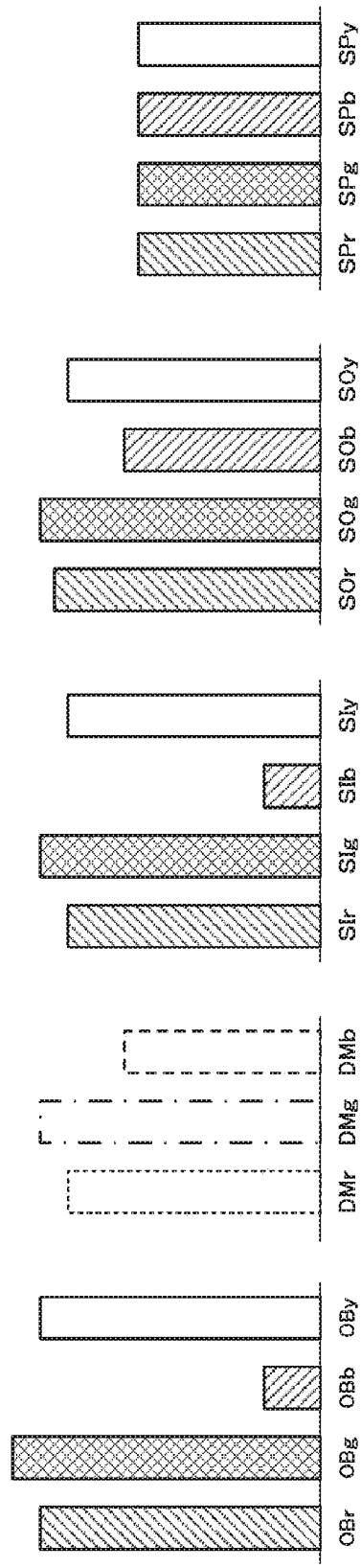

FIG. 11

| SITUATION OF INCIDENT LIGHT | LEVEL | DESIRED STATE | GAIN SETTING |
|---|---|---|---|
| $OBb > DMb$ | $SIr, SIg > SIb$ | REMOVE COLOR | $GC = 0$ |
| | $SIr > SIb > SIg$ | DEPENDING ON CASE | $(GC = 0)$ |
| | $SIg > SIb > SIr$ | DEPENDING ON CASE | $(GC = 0)$ |
| | $SIb > SIr, SIg$ | PERFORM NOTHING | $GC = 1$ |

SIGNAL PROCESSING DEVICE, SIGNAL PROCESSING METHOD, AND IMAGING DEVICE

CROSS REFERENCE TO RELATED APPLICATIONS

This application is a U.S. National Phase of International Patent Application No. PCT/JP2018/044523 filed on Dec. 4, 2018, which claims priority benefit of Japanese Patent Application No. JP 2018-031712 filed in the Japan Patent Office on Feb. 26, 2018. Each of the above-referenced applications is hereby incorporated herein by reference in its entirety.

TECHNICAL FIELD

This technology relates to a signal processing device, a signal processing method, and an imaging device.

BACKGROUND ART

Conventionally, it has been known that if a difference occurs in the dynamic range of each color component due to the sensitivity of an image element, white balance processing, or the like, in a case where a subject with a large amount of light is imaged, the color of the subject changes due to the difference in the dynamic range. For this reason, in Patent Document 1, a signal of another color component is clipped in accordance with a signal of a color component having the lowest dynamic range.

CITATION LIST

Patent Document

Patent Document 1: International Publication 2002/003711

SUMMARY OF THE INVENTION

Problems to be Solved by the Invention

By the way, if a signal of another color component is clipped in accordance with a signal of a color component having the lowest dynamic range, information of a subject having a high light amount obtained with other color components cannot be effectively used.

Therefore, it is an object of the present technology to provide a signal processing device, a signal processing method, and an imaging device that can make the influence of a difference in dynamic range little even in a case where the light amount of a subject is high.

Solutions to Problems

A first aspect of this technology is
a signal processing device including:
a gain setting part that sets a gain for a color signal obtained by performing color space conversion of converting an input signal into a luminance signal and the color signal, according to a setting reference signal based on the input signal; and
a gain adjustment part that performs gain adjustment of the color signal using the gain set by the gain setting part.

In this technology, an input signal, for example, a three primary color component signal obtained by performing imaging using a color separation filter is converted into a luminance signal and a color signal by a color space conversion part. In the gain setting part, a gain for a color signal obtained by performing color space conversion is set according to a setting reference signal based on an input signal, for example, a luminance signal obtained by color space conversion, and the set gain is used to perform gain adjustment of the color signal in the gain adjustment part.

The gain setting part performs gain setting so that the saturation of the subject indicated by the input signal decreases in a case where the setting reference signal is larger than a threshold. For example, in a case where the setting reference signal is larger than a first threshold and smaller than a second threshold larger than the first threshold, the gain setting part performs gain setting so that the saturation of the subject decreases as the signal level of the setting reference signal increases, and in a case where the setting reference signal is equal to or larger than the second threshold, the gain setting part performs gain setting so that the subject approaches an achromatic color. The first threshold is, for example, equal to or smaller than a smallest value in a dynamic range for each color component.

Furthermore, the gain setting part sets a setting reference signal on the basis of one or a plurality of color component signals selected from the input signal, and, in a case where the setting reference signal is larger than a threshold, performs gain setting of approaching the subject indicated by the input signal to an achromatic color. For example, the gain setting part performs gain setting so that, using a color component signal having a smallest dynamic range from the input signal as the setting reference signal, in a case where the setting reference signal is larger than a threshold, and all other color component signals different from the setting reference signal are smaller than the setting reference signal, and in a case where the setting reference signal is equal to or smaller than the threshold, gain adjustment of a color signal is not performed. Furthermore, in a case where the setting reference signal is larger than the threshold and all other color component signals different from the setting reference signal are equal to or larger than the setting reference signal, the gain setting part performs gain setting of approaching the subject to an achromatic color. Moreover, in a case where the color component signal having the smallest dynamic range in the input signal is larger than the threshold, and only one of the other color component signals different from the setting reference signal is equal to or larger than the color component signal having the smallest dynamic range, the gain setting part may generate the setting reference signal using the color component signal having the smallest dynamic range and the other color component signals from the input signal.

Furthermore, the signal processing device may further include a color space inverse conversion part that performs color space conversion of the luminance signal and the color signal that has been subjected to gain adjustment by the gain adjustment part, and generates an output signal of the same color space as the input signal.

A second aspect of this technology is
a signal processing method including:
setting, by a gain setting part, a gain for a color signal obtained by performing color space conversion of converting an input signal into a luminance signal and the color signal, according to a setting reference signal based on the input signal; and
performing, by a gain adjustment part, gain adjustment of the color signal using the gain set by the gain setting part.

A third aspect of this technology is
an imaging device including:
an imaging part that performs imaging using a color separation filter and generates three primary color component signals;
a color space conversion part that performs color space conversion of the three primary color component signals generated by the imaging part, and generates a luminance signal and a color signal different from the three primary color component signals;
a gain setting part that sets a gain of the color signal on the basis of the three primary color component signals or the luminance signal; and
a gain adjustment part that performs gain adjustment of the color signal using the gain set by the gain setting part.

Effects of the Invention

According to this technology, even in a case where the light amount of the subject is high, the influence of the difference in the dynamic range can be made little. Note that the effects described in this specification are merely examples, and the present invention is not limited thereto, and may have additional effects.

BRIEF DESCRIPTION OF DRAWINGS

FIGS. 5A, 5B, 5C, 5D, and 5E are diagrams showing an operation example in a case where the subject is white and only the light amount of a blue component exceeds the dynamic range of the blue component.

FIGS. 6A, 6B, 6C, 6D, and 6E are diagrams showing an operation example in a case where the subject is white and the light amount of each color component exceeds the dynamic range.

FIGS. 7A, 7B, 7C, 7D, and 7E are diagrams showing an operation example in a case where the subject is red and the light amount of red exceeds the dynamic range.

FIGS. 8A, 8B, 8C, 8D, and 8E show an operation example in a case where the subject is purple and the light amounts of red and blue exceed the dynamic range.

FIGS. 9A, 9B, 9C, 9D, and 9E show an operation example in a case where the subject is yellow and the light amounts of red and green exceed the dynamic range.

FIG. 11 is a diagram illustrating operation of a gain setting processing part.

MODE FOR CARRYING OUT THE INVENTION

Figure 1:
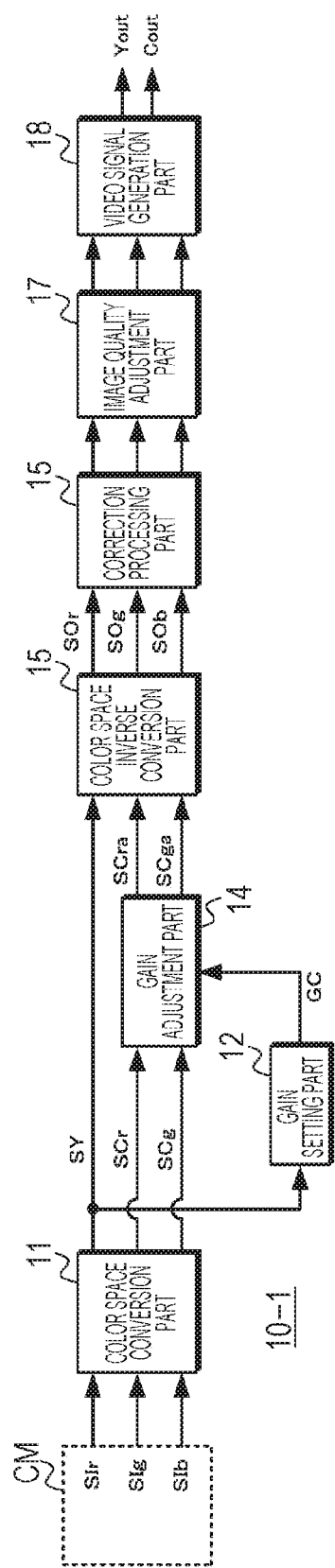
FIG. 1 is a diagram illustrating a configuration of an imaging system using a signal processing device according to a first embodiment.

Hereinafter, embodiments for carrying out the present technology will be described. Note that the description will be given in the following order.
1. First Embodiment
1-1. Configuration of signal processing device
1-2. Operation of signal processing device
2. Second Embodiment
2-1. Configuration of signal processing device
2-2. Operation of signal processing device
3. Other embodiments
4. Application Example
4-1. Application example to mobile body control system
4-2. Application example to endoscopic surgery system 1. First Embodiment 1-1. Configuration of Signal Processing Device FIG. 1 illustrates a configuration of an imaging system using a signal processing device according to a first embodiment. The imaging system has an imaging part CM and a signal processing device 10-1. The signal processing device 10-1 has a color space conversion part 11, a gain setting part 12, a gain adjustment part 14, and a color space inverse conversion part 15. Furthermore, the signal processing device 10-1 may be provided with a correction processing part 16 and an image quality adjustment part 17, and may be further provided with a video signal generation part 18. Furthermore, the imaging system may be provided with a camera control unit (CCU) that controls operation of the imaging part CM and the signal processing device 10-1.

The color space conversion part 11 converts a color space of the image signal generated by the imaging part CM into a color space including a luminance component and a color component. For example, the imaging part CM performs imaging using a color separation filter such as a color mosaic filter or a color separation prism, for example, and generates a color component signal SIr indicating a red component R, a color component signal Slg indicating a green component G, and a color component signal Slb indicating a blue component B. In this case, the color space conversion part 11 converts the three primary color component signals SIr, Slg, and Slb into a luminance signal SY, a red difference signal SCr, and a blue difference signal SCb. The color space conversion part 11 outputs the luminance signal SY to the gain setting part 12 and the color space inverse conversion part 15. Furthermore, the color space conversion part 11 outputs the red difference signal SCr and the blue difference signal SCb to the gain adjustment part 14.

Figure 2:
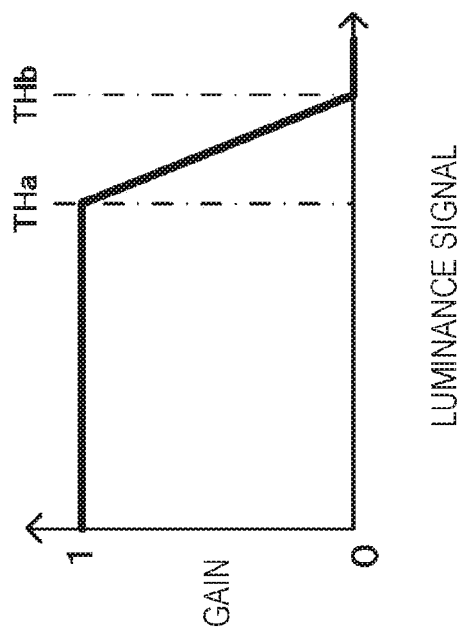
FIG. 2 is a diagram illustrating a relationship between a luminance signal and a gain.

The gain setting part 12 performs gain setting so that the subject indicated by the input signal approaches an achromatic color in a case where the setting reference signal is larger than a threshold. Specifically, the gain setting part 12 sets a gain GC for the red difference signal SCr and the blue difference signal SCb on the basis of the luminance signal SY using the luminance signal SY as a setting reference signal. FIG. 2 illustrates a relationship between a luminance signal and a gain. A first threshold THa indicates the level of the luminance signal SY at which decrease of the color component starts, and the color component is reduced as the luminance signal SY exceeds the first threshold THa and increases. Furthermore, the second threshold THb indicates the level of the luminance signal SY at which the color component is eliminated, and with the luminance signal SY equal to or larger than the second threshold THb, the color component is set to "0". The first threshold THa is set to, for example, a dynamic range of a color component having a smallest dynamic range or a value slightly smaller than the dynamic range. The second threshold THb is set to a value larger than the dynamic range of the color component having the smallest dynamic range. Note that the relationship between the first threshold THa and the second threshold THb, and the relationship between the luminance signal SY and the gain from the first threshold THa to the second threshold THb may be such that the user can adjust settings registered in advance.

On the basis of FIG. 2, the gain setting part 12 sets the gain GC to "GC=1" so that gain adjustment is not performed when the signal level of the luminance signal SY is equal to or smaller than first threshold THa. Furthermore, when the signal level of the luminance signal SY exceeds the first threshold THa, the gain setting part 12 decreases the gain GC as the signal level of the luminance signal SY increases, and sets the gain GC to "GC=0" so that the subject becomes achromatic when the signal level of the luminance signal SY is equal to or larger than the second threshold THb.

The gain adjustment part 14 adjusts the levels of the red difference signal SCr and the blue difference signal SCb with the gain set by the gain setting part 12, and outputs the level-adjusted red difference signal SCra and blue difference signal SCba to the color space inverse conversion part 15.

The color space inverse conversion part 15 performs color space conversion in a direction that is inverse of that in the color space conversion performed by the color space conversion part 11. Here, since the color space conversion part 11 converts the three primary color image signals into a luminance signal and a color difference signal, the color space inverse conversion part 15 converts the luminance signal and the color difference signal into three primary color image signals. That is, the color space inverse conversion part 15 converts the level-adjusted red difference signal SCra and blue difference signal SCba supplied from the gain adjustment part 14 and the luminance signal SY supplied from the color space conversion part 11 into three primary color component signals SOr, SOg, and SOb.

The correction processing part 16 performs correction processing on the color component signals SOr, SOg, and SOb. In the correction processing, for example, correction processing corresponding to an image sensor or an optical lens used in the imaging part CM is performed. For example, the correction processing part 16 performs correction processing of correcting a pixel signal for a defective pixel generated by an image sensor used in the imaging part CM. Furthermore, the correction processing part 16 performs correction processing of distortion and aberration generated by an optical lens used in the imaging part CM. The correction processing part 16 outputs the color component signal after the correction processing to the image quality adjustment part 17.

The image quality adjustment part 17 performs image quality adjustment using the color component signals supplied from the correction processing part 16. In image quality adjustment, color conversion to a color desired by a user, enhancement processing of contours or the like, knee correction to compress a high luminance region to a desired range, gamma processing for video output, gamma processing of standard dynamic range (SDR), gamma processing (opto-electronic transfer function (OETF) conversion) of high dynamic range (HDR), and the like are performed. The image quality adjustment part 17 outputs the color component signal after the image quality adjustment to the video signal generation part 18.

The video signal generation part 18 generates a video signal using the color component signal after the image quality adjustment. This video signal is output, for example, as a main line signal to an external device (for example, a monitor or the like) connected to the imaging system by wire or wirelessly. The video signal generation part 18 generates a video signal by, for example, converting the color component signal after the image quality adjustment into a luminance signal Yout and a color difference signal Cout.

1-2. Operation of Signal Processing Device

Figure 3:
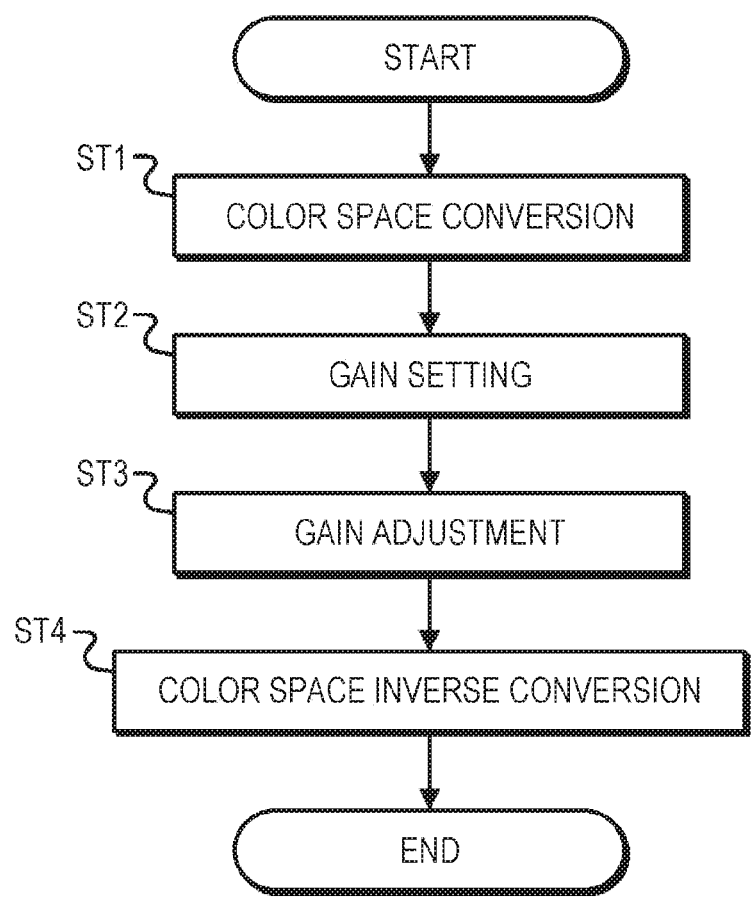
FIG. 3 is a flowchart illustrating operation of a signal processing device 10-1.
Figure 4E:
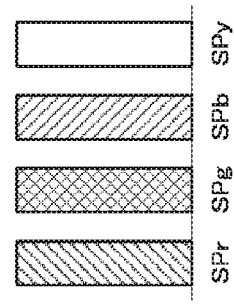
FIGS. 4A, 4B, 4C, 4D, and 4E are diagrams showing an operation example in a case where a subject is white and the light amount is smaller than that of the dynamic range of three primary color components.
Figure 4D:
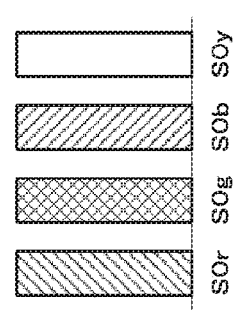
Figure 4C:
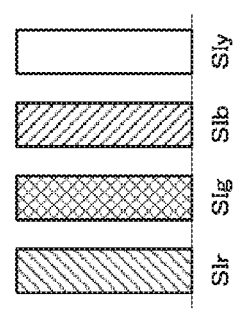
Figure 4B:
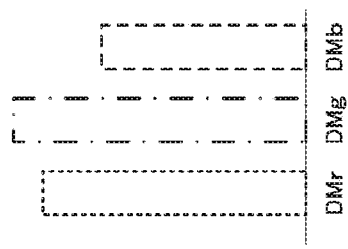
Figure 4A:
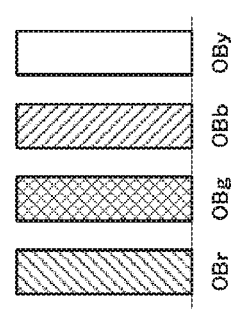

Next, the operation of the signal processing device will be described. FIG. 3 is a flowchart illustrating operation of the signal processing device 10-1.

In step ST1, the signal processing device performs color space conversion. The signal processing device 10-1 converts the three primary color component signals Slr, Slg, and Slb into the luminance signal SY, the red difference signal SCr, and the blue difference signal SCb, for example, and the process proceeds to step ST2.

In step ST2, the signal processing device performs gain setting. The signal processing device 10-1 sets the gain GC for the red difference signal SCr and the blue difference signal SCb on the basis of the signal level of the setting reference signal, using the luminance signal SY obtained in step ST1 as the setting reference signal, and the process proceeds to step ST3.

In step ST3, the signal processing device performs gain adjustment. The signal processing device 10-1 adjusts the levels of the red difference signal SCr and the blue difference signal SCb with the gain GC set in step ST2, and generates the red difference signal SCra and the blue difference signal SCba, and the process proceeds to step ST4.

In step ST4, the signal processing device performs color space inverse conversion. The signal processing device 10-1 uses the luminance signal generated in step ST2 and the level-adjusted red difference signal SCra and blue difference signal SCba generated in step ST3 to perform color space conversion in a direction that is inverse of that in the color space conversion in step ST1 to generate three primary color component signals SOr, SOg, and SOb.

Next, an operation example of the signal processing device will be described with reference to FIGS. 4A, 4B, 4C, 4D, 4E, 5A, 5B, 5C, 5D, 5E, 6A, 6B, 6C, 6D, 6E, 7A, 7B, 7C, 7D, 7E, 8A, 8B, 8C, 8D, 8E, 9A, 9B, 9C, 9D, and 9E. Note that FIGS. 4A, 5A, 6A, 7A, 8A, and 9A show light amounts OBr, OBg, and OBb and luminance OBy for each of the three primary color components of the subject. FIGS. 4B, 5B, 6B, 7B, 8B, and 9B show the dynamic range of the imaging part. For example, a case is illustrated where, in the three primary color components, the dynamic range DMb of the blue component is the smallest, the dynamic range DMg of the green component is the largest, and the dynamic range DMr of the red component is smaller than the dynamic range DMg and higher than the dynamic range DMb. FIGS. 4C, 5C, 6C, 7C, 8C, and 9C show the three primary color component signals Slr, Slg, and Slb input to the signal processing device 10-1 and the luminance signal Sly based on the three primary color component signals Slr, Slg, and Slb. FIGS. 4D, 5D, 6D, 7D, 8D, and 9D show the three primary color component signals SOr, SOg, and SOb after the signal processing output from the signal processing device 10-1, and a luminance signal SOy corresponding to the three primary color component signals SOr, SOg, and SOb. Note that FIGS. 4E, 5E, 6E, 7E, 8E, and 9E show the three primary color component signals SPr, SPg, and SPb and a luminance signal SPy corresponding to the three primary color component signals SPr, SPg, and SPb when a conventional technology is used, in order to clarify the difference between the present technology and the conventional technology.

FIGS. 4A, 4B, 4C, 4D, and 4E show an operation example in a case where the subject is white and the light amount is smaller than that of the dynamic range of the three primary color components. Note that, in this case, the three primary color component signals Slr, Slg, and Slb input to the signal processing device 10-1 and the luminance signal Sly based on the three primary color component signals Slr, Slg, and Slb have a signal level according to the light amount of the subject. Furthermore, in a case where the luminance signal Sly, which is the setting reference signal, is equal to or smaller than the first threshold THa, the gain GC is set to "GC=1" so that the gain adjustment is not performed, and the color component signal SOr output from the signal processing device 10-1 is equal to the color component signal Slr of the input signal. Furthermore, the color component signal SOg output from the signal processing device 10-1 is equal to the color component signal Slg of the input signal, the color component signal SOb is equal to the color component signal Slb of the input signal, and the luminance signal SOy based on the three primary color component signals SOr, SOg, SOb is equal to the luminance signal Sly based on the input signal. Note that, since the subject is white and the light amount is smaller than that of the dynamic range of the three primary color components, the three primary color component signals SPr, SPg, and SPb when using the conventional technology are equal to the three primary color component signals SOr, SOg, and SOb, and the luminance signal SPy based on the three primary color component signals SPr, SPg, and SPb is equal to the luminance signal SOy.

FIGS. 5A, 5B, 5C, 5D, and 5E show an operation example in a case where the subject is white and only the light amount of a blue component exceeds the dynamic range of the blue component. In this case, the color component signals Slr and Slg input to the signal processing device 10-1 have signal levels corresponding to the light amount of the subject, and the color component signal Slb has a level clipped in the dynamic range. Therefore, the subject indicated by the three primary color component signals Slr, Slg, and Slb is colored yellow. Furthermore, the luminance signal Sly has a level based on the color component signals Slr and Slg and the clipped color component signal Slb. Here, in a case where the luminance signal Sly, which is the setting reference signal, is equal to or larger than the second threshold THb, the gain GC is set to "GC=0" so that the subject becomes achromatic. Therefore, the color component signals SOr, SOg, and SOb output from the signal processing device 10-1 have a signal level indicating white according to the luminance signal SOy (=Sly), and the color component signal SOb has a higher signal level than the color component signal Slb before processing. Therefore, even in a case where only the light amount of the blue component exceeds the dynamic range of the blue component, a white subject having a large light amount can be expressed by the color component signals SOr, SOg, and SOb. Note that, in the conventional technology, when the color component signal Slb is clipped according to the dynamic range of the blue component, the signal levels of the color component signals SPr and SPg are adjusted so that the subject becomes white, using the clipped color component signal Slb. Therefore, in an image based on the three primary color component signals SPr, SPg, and SPb, the luminance of the white subject decreases, and a white subject with a large light amount cannot be expressed.

FIGS. 6A, 6B, 6C, 6D, and 6E show an operation example in a case where the subject is white and the light amount of each color component exceeds the dynamic range. In this case, the color component signals Slr, Slg, and Slb input to the signal processing device 10-1 have a level clipped in the dynamic range. Therefore, the subject indicated by the three primary color component signals Slr, Slg, and Slb is colored according to the difference in the dynamic range. Furthermore, the luminance signal Sly has a level based on the clipped color component signals Slr, Slg, and Slb. Here, in a case where the luminance signal Sly, which is the setting reference signal, is equal to or larger than the second threshold THb, the gain GC is set to "GC=0". Therefore, the color component signals SOr, SOg, and SOb output from the signal processing device 10-1 have a signal level indicating white according to the luminance signal SOy (=Sly). Therefore, even in a case where the light amount of each color component exceeds the dynamic range, a white subject having a large light amount can be expressed by reducing decrease in luminance by the color component signals SOr, SOg, and SOb. Note that, in the conventional technology, when the color component signal Slb having the smallest dynamic range is clipped, the signal level of the color component signals SPr and SPg is adjusted so that the subject becomes white using the clipped color component signal Slb. Therefore, in an image based on the three primary color component signals SPr, SPg, and SPb, the luminance of the white subject decreases, and a white subject with a large light amount cannot be expressed.

By the way, FIGS. 4A, 4B, 4C, 4D, 4E, 5A, 5B, 5C, 5D, 5E, 6A, 6B, 6C, 6D, and 6E illustrate the operation in a case where the subject is white, but the color of the subject is not limited to white. Next, the operation in a case where the color of the subject is not white will be exemplified.

FIGS. 7A, 7B, 7C, 7D, and 7E show an operation example in a case where the subject is red and the light amount of red exceeds the dynamic range. In this case, the color component signal Slr input to the signal processing device 10-1 has a level clipped in the dynamic range. Furthermore, the luminance signal Sly has a level based on the clipped color component signal Sir and the non-clipped color component signals Slg and Slb. Here, in a case where the luminance signal Sly, which is the setting reference signal, is equal to or smaller than the first threshold THa, the gain GC is set to "GC=1", and the color component signals SOr, SOg, and SOb output from the signal processing device 10-1 are equal to the color component signals Slr, Slg, and Slb of the input signal. Therefore, even in a case where the light amount of the red component exceeds the dynamic range, a subject having a large light amount of the red component can be expressed by the color component signals SOr, SOg, and SOb without losing the saturation. Note that, in the conventional technology, when one color component signal is clipped, the signal level is adjusted so that the subject becomes white. Therefore, in an image based on the three primary color component signals SPr, SPg, and SPb, the color of a subject having a large light amount of a specific color component cannot be expressed.

FIGS. 8A, 8B, 8C, 8D, and 8E show an operation example in a case where the subject is purple and the light amounts of red and blue exceed the dynamic range. In this case, the color component signals Slr and Slb input to the signal processing device 10-1 have a level clipped in the dynamic range. The luminance signal Sly has a level based on the clipped color component signals Slr and Slb and the non-clipped color component signals Slg. Here, in a case where the luminance signal Sly, which is the setting reference signal, is equal to or smaller than the first threshold THa, the gain GC is set to "GC=1", and the color component signals SOr, SOg, and SOb output from the signal processing device 10-1 are equal to the color component signals Slr, Slg, and Slb. Therefore, even in a case where the light amounts of the red component and the blue component exceed the dynamic range, a subject having a large light amount of the red component and the blue component can be expressed by the color component signals SOr, SOg, and SOb without losing the saturation. Note that, in the conventional technology, when one color component signal is clipped, the signal level is adjusted so that the subject becomes white. Therefore, in an image based on the three primary color component signals SPr, SPg, and SPb, the color of a subject having a large light amount of a specific color component cannot be expressed.

FIGS. 9A, 9B, 9C, 9D, and 9E show an operation example in a case where the subject is yellow and the light amounts of red and green exceed the dynamic range. In this case, the color component signals Slr and Slg input to the signal processing device 10-1 have a level clipped in the dynamic range. The luminance signal Sly has a level based on the clipped color component signals Slr and Slg and the non-clipped color component signals Slb. Here, in a case where the luminance signal Sly, which is the setting reference signal, is larger than the first threshold THa and smaller than the second threshold THb, the gain GC is decreased as the luminance signal Sly increases with the value of the gain GC being larger than "GC=0" and smaller than "GC=1". That is, processing of reducing the color difference signal as the luminance signal Sly increases is performed. Therefore, for the color component signals SOr, SOg, and SOb output from the signal processing device 10-1, the luminance signal SOy based on the color component signals SOr, SOg, and SOb is equal to the luminance signal Sly, and the signal level difference among the color component signal SOr, the color component signal SOg, and the color component signal SOb is reduced. Therefore, even in a case where the light amounts of the red component and the green component exceed the dynamic range, a subject having a large light amount of the red component and the green component can be expressed by the color component signals SOr, SOg, and SOb with the saturation retained. Note that, in the conventional technology, when one color component signal is clipped, the signal level is adjusted so that the subject becomes white. Therefore, in an image based on the three primary color component signals SPr, SPg, and SPb, the color of a subject having a large light amount of a specific color component cannot be expressed.

As described above, according to the first embodiment, even in a case where the light amount of the subject is large, the influence of the difference in the dynamic range can be made little. For this reason, it is possible to prevent unnecessary coloring and a reduction in the expression range of luminance and color.

2. Second Embodiment

Next, a second embodiment will be described. In the above-described first embodiment, the gain is set using the luminance signal generated in the color space conversion part as the setting reference signal. However, in the second embodiment, a case will be described in which the setting reference signal is generated on the basis of the three primary color component signals input to the color space conversion part.

2-1. Configuration of Signal Processing Device

Figure 10:
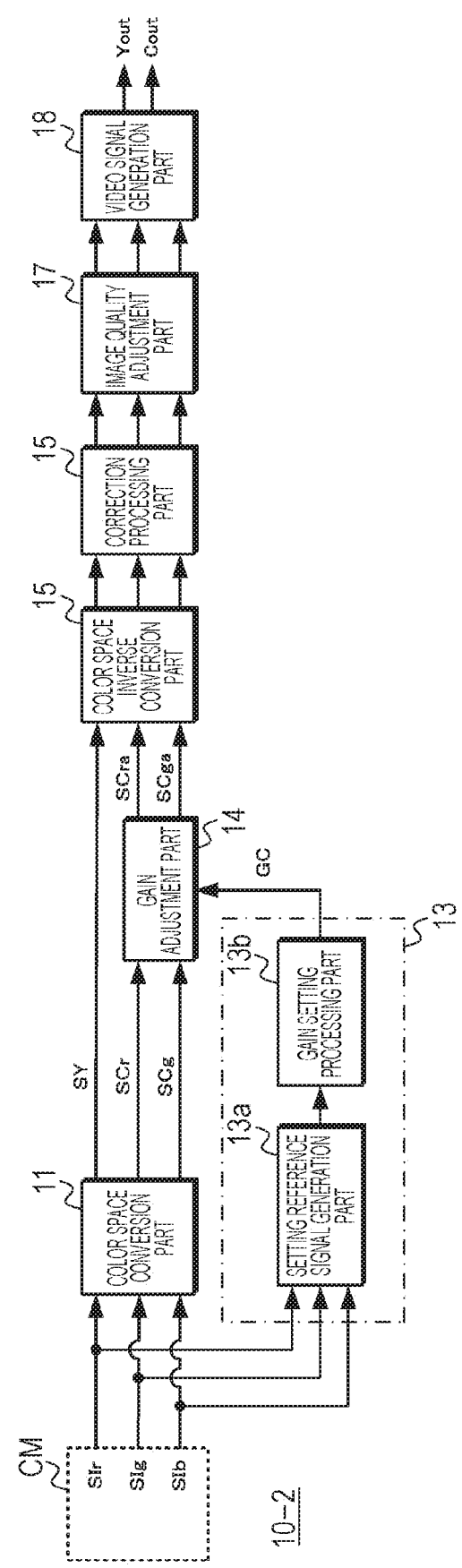
FIG. 10 is a diagram illustrating a configuration of an imaging system using a signal processing device according to a second embodiment.

FIG. 10 illustrates a configuration of an imaging system using a signal processing device according to the second embodiment. The imaging system has an imaging part CM and a signal processing device 10-2. The signal processing device 10-2 has a color space conversion part 11, a gain setting part 13, a gain adjustment part 14, and a color space inverse conversion part 15. Furthermore, the signal processing device 10-2 may be provided with a correction processing part 16 and an image quality adjustment part 17, and may be further provided with a video signal generation part 18. Furthermore, the imaging system may be provided with a camera control unit (CCU) that controls operation of the imaging part CM and the signal processing device 10-1.

The color space conversion part 11 converts a color space of the image signal generated by the imaging part CM into a color space including a luminance component and a color component. For example, the imaging part CM performs imaging using a color separation filter such as a color mosaic filter or a color separation prism, for example, and generates a color component signal SIr indicating a red component R, a color component signal Slg indicating a green component G, and a color component signal Slb indicating a blue component B. In this case, the color space conversion part 11 converts the three primary color component signals Slr, Slg, and Slb into a luminance signal SY, a red difference signal SCr, and a blue difference signal SCb. The color space conversion part 11 outputs the luminance signal SY to the color space inverse conversion part 15. Furthermore, the color space conversion part 11 outputs the red difference signal SCr and the blue difference signal SCb to the gain adjustment part 14.

The gain setting part 13 has a setting reference signal generation part 13a and a gain setting processing part 13b. The setting reference signal generation part 13a generates a setting reference signal as a gain setting reference on the basis of one or a plurality of color component signals selected from the three primary color component signals Slr, Slg, and Slb input to the color space conversion part 11. The setting reference signal generation part 13a selects a color component signal having the smallest dynamic range from the three primary color component signals Slr, Slg, and Slb, for example, and sets the selected color component signal as the setting reference signal. Furthermore, the setting reference signal generation part 13a may use, for example, the median value of the three primary color component signals Slr, Slg, and Slb as the setting reference signal, or generate a setting reference signal by mixing a plurality of color component signals from the three primary color component signals Slr, Slg, and Slb at a predetermined ratio. Furthermore, in a case where it is desired to retain the color without causing achromaticity even if the signal levels of the three primary color component signals become high, the color component signal having the largest dynamic range from the three primary color component signals Slr, Slg, and Slb may be used as the setting reference signal. The setting reference signal generation part 13a outputs the generated setting reference signal to the gain setting processing part 13b.

The gain setting processing part 13b compares the setting reference signal with a threshold, performs gain setting on the basis of the comparison result, and outputs the set gain to the gain adjustment part 14. Note that the operation of the gain setting processing part will be described later.

The gain adjustment part 14 adjusts the levels of the red difference signal SCr and the blue difference signal SCb with the gain set by the gain setting part 13, and outputs the level-adjusted red difference signal SCra and blue difference signal SCba to the color space inverse conversion part 15.

The color space inverse conversion part 15 performs color space conversion in a direction that is inverse of that in the color space conversion performed by the color space conversion part 11. Here, since the color space conversion part 11 converts the three primary color image signals into a luminance signal and a color difference signal, the color space inverse conversion part 15 converts the luminance signal and the color difference signal into three primary color image signals. That is, the color space inverse conversion part 15 converts the level-adjusted red difference signal SCra and blue difference signal SCba supplied from the gain adjustment part 14 and the luminance signal SY supplied from the color space conversion part 11 into three primary color component signals SOr, SOg, and SOb.

The correction processing part 16 performs correction processing on the color component signals SOr, SOg, and SOb, and outputs the color component signal after the correction processing to the image quality adjustment part 17. The image quality adjustment part 17 performs image quality adjustment using the color component signal supplied from the correction processing part 16, and outputs the color component signal after the image quality adjustment to the video signal generation part 18. The video signal generation part 18 generates a video signal by, for example, converting the color component signal after the image quality adjustment into a luminance signal Yout and a color difference signal Cout.

2-2. Operation of Signal Processing Device

Next, the operation of the signal processing device 10-2 will be described. The signal processing device 10-2 is different from the operation of the signal processing device 10-1 shown in FIG. 3 in the gain setting in step ST2.

The signal processing device 10-2 generates a setting reference signal for performing gain setting on the basis of the input three primary color component signals, and sets the gain on the basis of the result of comparison between the setting reference signal and the threshold, and the signal level of the setting reference signal. For example, the signal processing device 10-2 sets the color component signal having the smallest dynamic range among the input three primary color component signals Slr, Slg, and Slb as the setting reference signal. Furthermore, the dynamic range of the color component having the largest dynamic range in the three primary colors, or a value slightly smaller than the dynamic range is set to the threshold TH.

FIG. 11 is a diagram illustrating operation of the gain setting processing part. The dynamic range decreases in the order of the red component, the green component, and the blue component. The threshold TH has the dynamic range of the blue component having the smallest dynamic range, that is, the threshold TH is the largest value of the color component signal Slb, or a value slightly smaller than the largest value by a predetermined amount. Furthermore, FIG. 11 illustrates a case where the light amount OBb of the blue component of the subject exceeds the dynamic range DMg.

The signal processing device 10-2 compares the setting reference signal with the threshold TH, and in a case where the setting reference signal is equal to or larger than the threshold TH, and in a case where all other color component signals have a signal level smaller than the setting reference signal, the signal processing device 10-2 sets the gain GC to "GC=1" so that gain adjustment is not performed. Therefore, the color component signals SOr, SOg, and SOb output from the signal processing device 10-1 are equal to the color component signals Slr, Slg, and Slb, and there is no decrease in saturation.

Furthermore, in a case where the setting reference signal is equal to or larger than the threshold TH and all other color component signals are larger than the setting reference signal, the gain GC is set to "GC=0" so that the subject becomes achromatic. That is, the signal levels of the red difference signal and the blue difference signal are set to "0", and the image based on the color component signals SOr, SOg, and SOb output from the signal processing device 10-1 becomes an achromatic image, so that a false color generation is suppressed.

Moreover, in a case where the setting reference signal is equal to or larger than the threshold TH and one of the other two color component signals is larger than the setting reference signal, a user or the like may specify the gain GC to either "GC=1" or "GC=0" in advance. Furthermore, in a case where the setting reference signal is equal to or larger than the threshold TH and one of the other two color component signals is larger than the setting reference signal, if the setting reference signal is set using also the other color component signal indicating the intermediate value or the largest value, it becomes easier to remove the color of the subject.

Furthermore, if the color component signal having the largest dynamic range is used as the setting reference signal, the signal level at which the gain GC is set to "GC=0" for achromatic is high as compared with the case where the color component signal having the smallest dynamic range is used as the setting reference signal. Therefore, as compared with the case where a color component signal having the smallest dynamic range is used as the setting reference signal, even if the signal level is increased, although the color reproducibility is reduced, the color can be retained.

As described above, according to the second embodiment, as similar to the first embodiment, even in a case where the light amount of the subject is large, the influence of the difference in the dynamic range can be made little. For this reason, it is possible to prevent unnecessary coloring and a reduction in the expression range of luminance and color. Moreover, in the second embodiment, since the setting reference signal is generated on the basis of the color component signal selected from the input signal, as compared to the case where the luminance signal is used as the setting reference signal as in the first embodiment, gain adjustment with a high degree of freedom can be performed. Note that, in the second embodiment, the gain adjustment is performed on the basis of the comparison result of the setting reference signal being the threshold TH. However, the gain adjustment may be performed according to the comparison result with the thresholds THa and THb as similar to the first embodiment.

3. Other Embodiments

In the above-described first and second embodiments, the case has been described where the color space conversion of the three primary color component signals is performed to generate a luminance signal and a color difference signal. However, for the color space conversion, it is sufficient that a signal indicating a luminance component and a color component can be generated, and conversion result is not limited to a luminance signal and a color difference signal. For example, in color space conversion, conversion to Lab color space (L*, b*) may be performed, or conversion to Luv color space (L*, u*, v*) may be performed. Furthermore, the image signal generated by the imaging part CM is not limited to the three primary color component signals of the three primary colors of R, G, and B, and may be other signals. Furthermore, the signal processing device 10-1 (10-2) may be configured integrally with the imaging part CM and used as a part of the imaging device.

4. Application Example 4-1. Application Example to Mobile Body Control System

The technology according to the present disclosure can be applied to various products. For example, the technology according to the present disclosure may be realized as a device mounted on any type of mobile body such as an automobile, electric vehicle, hybrid electric vehicle, motorcycle, bicycle, personal mobility, airplane, drone, ship, robot, construction machine, or agricultural machine (tractor).

Figure 12:
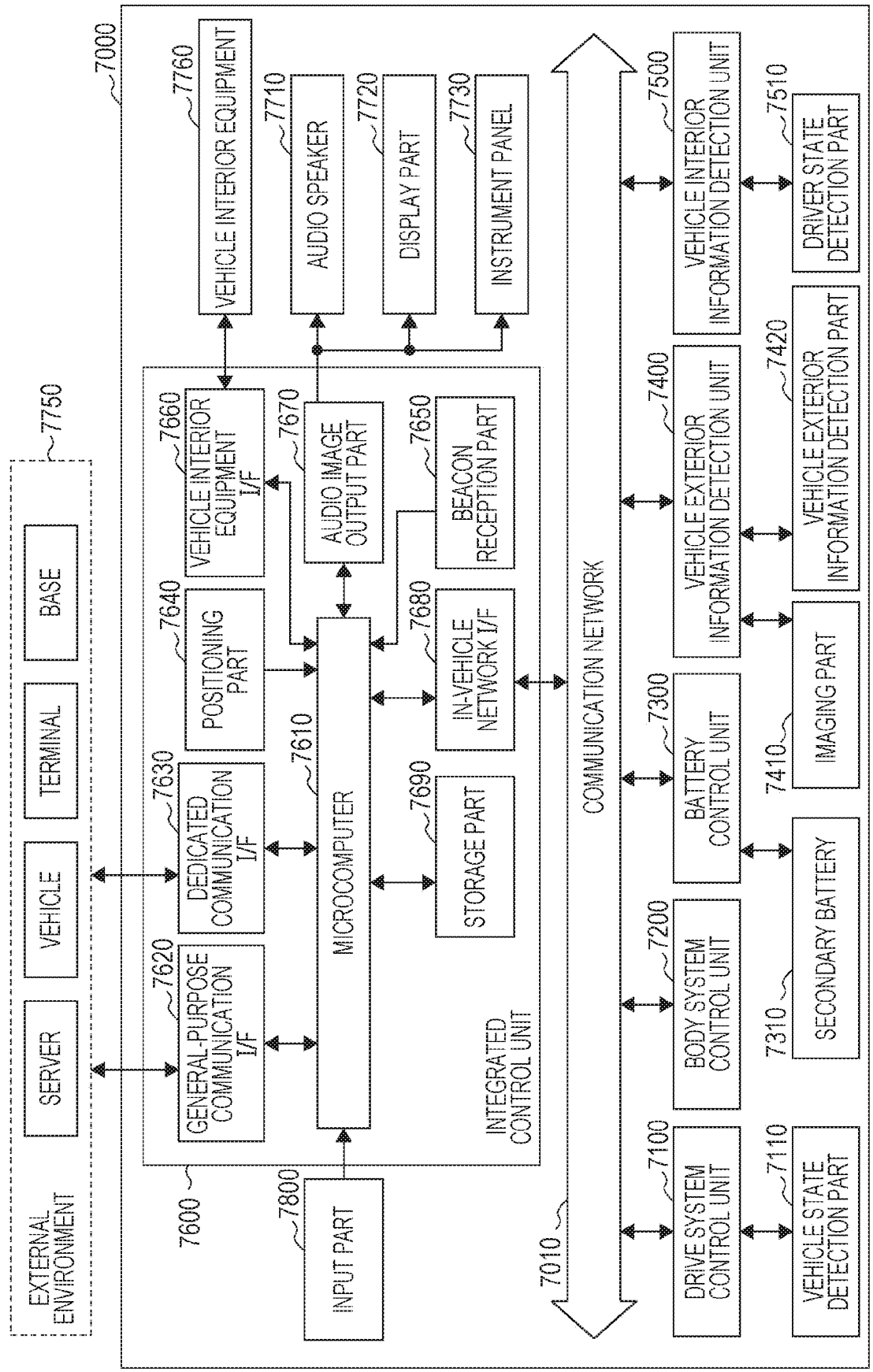
FIG. 12 is a block diagram showing an example of a schematic configuration of a vehicle control system.

FIG. 12 is a block diagram showing a schematic configuration example of a vehicle control system 7000 which is an example of a mobile body control system to which the technology according to the present disclosure can be applied. The vehicle control system 7000 includes a plurality of electronic control units connected via a communication network 7010. In the example shown in FIG. 12, the vehicle control system 7000 includes a drive system control unit 7100, a body system control unit 7200, a battery control unit 7300, a vehicle exterior information detection unit 7400, a vehicle interior information detection unit 7500, and an integrated control unit 7600. The communication network 7010 connecting the plurality of control units may be, for example, an in-vehicle communication network conforming to an arbitrary standard such as the controller area network (CAN), the local interconnect network (LIN), the local area network (LAN), or the FlexRay (registered trademark).

Each control unit includes a microcomputer that performs operation processing according to various programs, a storage part that stores programs executed by the microcomputer, parameters used for various operations, or the like, and a drive circuit that drives devices subjected to various control. Each control unit includes a network I/F for communicating with another control unit via the communication network 7010, and includes a communication I/F for communication by wired communication or wireless communication with vehicle interior or exterior device, a sensor, or the like. FIG. 12 shows, as functional configuration of the integrated control unit 7600, a microcomputer 7610, a general-purpose communication I/F 7620, a dedicated communication I/F 7630, a positioning part 7640, a beacon reception part 7650, vehicle interior equipment I/F 7660, an audio image output part 7670, an in-vehicle network I/F 7680, and a storage part 7690. Similarly, each of the other control units includes a microcomputer, a communication I/F, a storage part, and the like.

The drive system control unit 7100 controls the operation of the device related to the drive system of the vehicle according to various programs. For example, the drive system control unit 7100 functions as a control device of a driving force generation device for generating a drive force of a vehicle such as an internal combustion engine or a driving motor, a drive force transmission mechanism for transmitting a drive force to wheels, a steering mechanism that adjusts a wheeling angle of the vehicle, a braking device that generates a braking force of the vehicle, and the like. The drive system control unit 7100 may have a function as a control device such as antilock brake system (ABS), or an electronic stability control (ESC).

A vehicle state detection part 7110 is connected to the drive system control unit 7100. The vehicle state detection part 7110 includes, for example, at least one of a gyro sensor that detects the angular velocity of the axis rotational motion of the vehicle body, an acceleration sensor that detects the acceleration of the vehicle, or a sensor for detecting an operation amount of an accelerator pedal, an operation amount of a brake pedal, steering of a steering wheel, an engine rotation speed, a wheel rotation speed, or the like. The drive system control unit 7100 performs operation processing using the signal input from the vehicle state detection part 7110 and controls the internal combustion engine, the driving motor, the electric power steering device, the brake device, or the like.

The body system control unit 7200 controls the operation of various devices mounted on the vehicle according to various programs. For example, the body system control unit 7200 functions as a keyless entry system, a smart key system, a power window device, or a control device for various lamps such as a head lamp, a back lamp, a brake lamp, a turn indicator, or a fog lamp. In this case, radio waves transmitted from a portable device that substitute keys or signals of various switches may be input to the body system control unit 7200. The body system control unit 7200 receives input of these radio waves or signals and controls a door lock device, a power window device, a lamp, or the like of the vehicle.

The battery control unit 7300 controls a secondary battery 7310 that is a power supply source of the driving motor according to various programs. For example, information such as battery temperature, a battery output voltage, or remaining capacity of the battery is input to the battery control unit 7300 from the battery device including the secondary battery 7310. The battery control unit 7300 performs arithmetic processing using these signals and controls the temperature adjustment of the secondary battery 7310, or the cooling device or the like included in the battery device.

The vehicle exterior information detection unit 7400 detects information outside the vehicle equipped with the vehicle control system 7000. For example, at least one of the imaging part 7410 or the vehicle exterior information detection part 7420 is connected to the vehicle exterior information detection unit 7400. The imaging part 7410 includes at least one of a time of flight (ToF) camera, a stereo camera, a monocular camera, an infrared camera, or other cameras. The vehicle exterior information detection part 7420 includes, for example, at least one of an environmental sensor for detecting the current weather or climate, or an ambient information detection sensor for detecting another vehicle, an obstacle, a pedestrian, or the like around the vehicle equipped with the vehicle control system 7000.

The environmental sensor may be, for example, at least one of a raindrop sensor that detects rain, a fog sensor that detects mist, a sunshine sensor that detects sunshine degree, or a snow sensor that detects snowfall. The ambient information detection sensor may be at least one of an ultrasonic sensor, a radar device, or a light detection and ranging, laser imaging detection and ranging (LIDAR) device. The imaging part 7410 and the vehicle exterior information detection part 7420 may be provided as independent sensors or devices, respectively, or may be provided as a device in which a plurality of sensors or devices is integrated.

Figure 13:
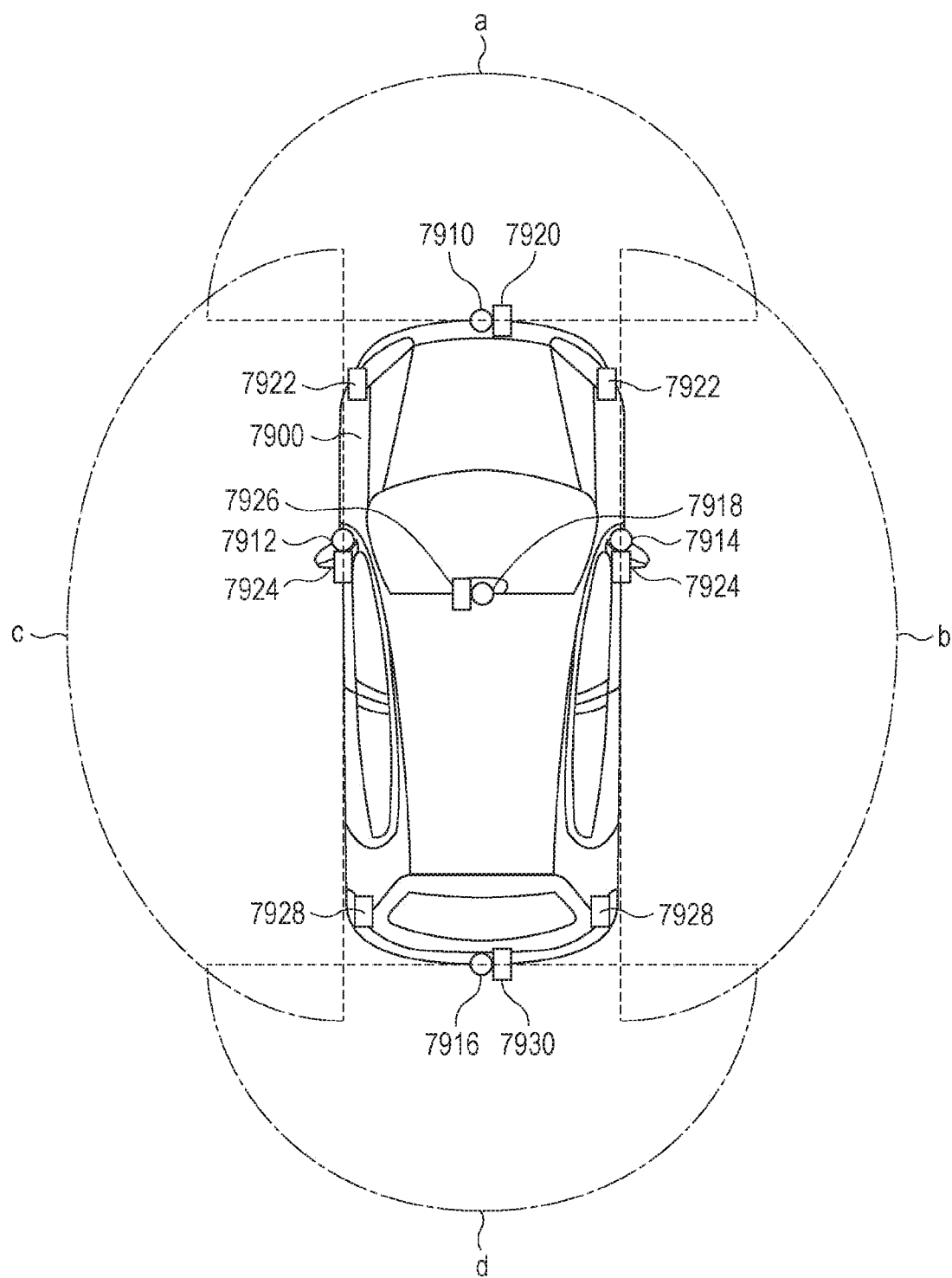
FIG. 13 is an explanatory diagram showing an example of installation positions of a vehicle exterior information detection part and an imaging part.

Here, FIG. 13 shows an example of installation positions of the imaging part 7410 and the vehicle exterior information detection part 7420. Imaging parts 7910, 7912, 7914, 7916, and 7918 are provided at, for example, at least one of a front nose, a side mirror, a rear bumper, or a back door of the vehicle 7900, or an upper portion of a windshield in the vehicle compartment. The imaging part 7910 provided in the front nose and the imaging part 7918 provided in the upper portion of the windshield in the vehicle compartment mainly acquire an image ahead of the vehicle 7900. The imaging parts 7912 and 7914 provided in the side mirror mainly acquire an image of the side of the vehicle 7900. The imaging part 7916 provided in the rear bumper or the back door mainly acquires an image behind the vehicle 7900. The imaging part 7918 provided on the upper portion of the windshield in the vehicle compartment is mainly used for detecting a preceding vehicle, a pedestrian, an obstacle, a traffic signal, a traffic sign, a lane, or the like.

Note that FIG. 13 shows an example of the imaging range of each of the imaging parts 7910, 7912, 7914, and 7916. An imaging range a indicates the imaging range of the imaging part 7910 provided in the front nose, imaging ranges b and c indicate the imaging ranges of the imaging parts 7912 and 7914 provided in the side mirror, respectively, and an imaging range d indicates the imaging range of the imaging part 7916 provided in the rear bumper or the back door. For example, by superimposing the image data imaged by the imaging parts 7910, 7912, 7914, and 7916, an overhead view image of the vehicle 7900 viewed from above is obtained.

The vehicle exterior information detection parts 7920, 7922, 7924, 7926, 7928, and 7930 provided on the front, rear, side, or corner of the vehicle 7900 and the windshield in the upper portion of the vehicle compartment may be ultrasonic sensors or radar devices, for example. The vehicle exterior information detection parts 7920, 7926, and 7930 provided at the front nose, the rear bumper, or the back door of the vehicle 7900, and the upper portion of the windshield of the vehicle compartment may be the LIDAR device, for example. These vehicle exterior information detection parts 7920 to 7930 are mainly used for detecting a preceding vehicle, a pedestrian, an obstacle, or the like.

Returning to FIG. 12, the description will be continued. The vehicle exterior information detection unit 7400 causes the imaging part 7410 to image an image of the exterior of the vehicle and receives the imaged image data. Furthermore, the vehicle exterior information detection unit 7400 receives the detection information from the connected vehicle exterior information detection part 7420. In a case where the vehicle exterior information detection part 7420 is an ultrasonic sensor, a radar device, or a LIDAR device, the vehicle exterior information detection unit 7400 transmits ultrasonic waves, electromagnetic waves, or the like, and receives information of the received reflected waves. The vehicle exterior information detection unit 7400 may perform object detection processing of a person, a car, an obstacle, a sign, a character on a road surface, or the like, or distance detection processing on the basis of the received information. The vehicle exterior information detection unit 7400 may perform environment recognition processing for recognizing rainfall, fog, road surface condition, or the like on the basis of the received information. The vehicle exterior information detection unit 7400 may calculate the distance to the object outside the vehicle on the basis of the received information.

Furthermore, the vehicle exterior information detection unit 7400 may perform image recognition processing of recognizing a person, a car, an obstacle, a sign, a character on a road surface, or the like, or distance detection processing, on the basis of the received image data. The vehicle exterior information detection unit 7400 performs processing such as distortion correction or positioning on the received image data and synthesizes the image data imaged by different imaging parts 7410 to generate an overhead view image or a panorama image. The vehicle exterior information detection unit 7400 may perform viewpoint conversion processing using image data imaged by different imaging parts 7410.

The vehicle interior information detection unit 7500 detects vehicle interior information. For example, a driver state detection part 7510 that detects the state of the driver is connected to the vehicle interior information detection unit 7500. The driver state detection part 7510 may include a camera for imaging the driver, a biometric sensor for detecting the biological information of the driver, a microphone for collecting sound in the vehicle compartment, and the like. The biometric sensor is provided on, for example, a seating surface, a steering wheel, or the like, and detects biometric information of an occupant sitting on a seat or a driver holding a steering wheel. The vehicle interior information detection unit 7500 may calculate the degree of fatigue or the degree of concentration of the driver on the basis of the detection information input from the driver state detection part 7510, and may determine whether or not the driver is sleeping. The vehicle interior information detection unit 7500 may perform processing such as noise canceling processing on the collected sound signal.

The integrated control unit 7600 controls the overall operation of the vehicle control system 7000 according to various programs. An input part 7800 is connected to the integrated control unit 7600. The input part 7800 is realized by a device such as a touch panel, a button, a microphone, a switch, or a lever that can be input operated by an occupant, for example. Data obtained by performing speech recognition on the sound input by the microphone may be input to the integrated control unit 7600. The input part 7800 may be, for example, a remote control device using infrared rays or other radio waves, or an external connection device such as a mobile phone or a personal digital assistant (PDA) corresponding to the operation of the vehicle control system 7000. The input part 7800 may be, for example, a camera, in which case the occupant can input information by gesture. Alternatively, data obtained by detecting the movement of the wearable device worn by the occupant may be input. Moreover, the input part 7800 may include, for example, an input control circuit or the like that generates an input signal on the basis of information input by an occupant or the like using the input part 7800 and outputs the input signal to the integrated control unit 7600. By operating the input part 7800, an occupant or the like inputs various data or gives an instruction on processing operation to the vehicle control system 7000.

The storage part 7690 may include a read only memory (ROM) that stores various programs to be executed by the microcomputer, and a random access memory (RAM) that stores various parameters, operation results, sensor values, or the like. Furthermore, the storage part 7690 may be realized by a magnetic storage device such as a hard disc drive (HDD), a semiconductor storage device, an optical storage device, a magneto-optical storage device, or the like.

The general-purpose communication I/F 7620 is a general-purpose communication I/F that mediates communication with various devices existing in an external environment 7750. A cellular communication protocol such as global system of mobile communications (GSM) (registered trademark), WiMAX (registered trademark), long term evolution (LTE (registered trademark)), or LTE-advanced (LTE-A), or other wireless communication protocols such as a wireless LAN (Wi-Fi (registered trademark)), or Bluetooth (registered trademark), may be implemented in the general-purpose communication I/F 7620. The general-purpose communication I/F 7620 may be connected to a device (for example, an application server or a control server) existing on an external network (for example, the Internet, a cloud network, or a company specific network) via a base station or an access point, for example. Furthermore, the general-purpose communication I/F 7620 uses, for example, the peer to peer (P2P) technology and may be connected with a terminal existing in the vicinity of the vehicle (for example, a terminal of a driver, a pedestrian, or a shop, or a machine type communication (MTC) terminal).

The dedicated communication I/F 7630 is a communication I/F supporting a communication protocol formulated for use in a vehicle. For example, in the dedicated communication I/F 7630, a standard protocol such as the wireless access in vehicle environment (WAVE) that is combination of lower layer IEEE 802.11p and upper layer IEEE 1609, the dedicated short range communications (DSRC), or the cellular communication protocol may be implemented. Typically, the dedicated communication I/F 7630 performs V2X communication that is concept including one or more of a vehicle to vehicle communication, a vehicle to infrastructure communication, a vehicle to home communication, and a vehicle to pedestrian communication.

The positioning part 7640 receives, for example, a global navigation satellite system (GNSS) signal from a GNSS satellite (for example, a global positioning system (GPS) signal from a GPS satellite) and performs positioning, to generate position information including the latitude, longitude, and altitude of the vehicle. Note that the positioning part 7640 may specify the current position by exchanging signals with the wireless access point or may acquire the position information from a terminal such as a mobile phone, a PHS, or a smartphone having a positioning function.

The beacon reception part 7650 receives, for example, radio waves or electromagnetic waves transmitted from a radio station or the like installed on the road, and acquires information such as the current position, congestion, road closure, or required time. Note that the function of the beacon reception part 7650 may be included in the dedicated communication I/F 7630 described above.

The vehicle interior equipment I/F 7660 is a communication interface that mediates connection between the microcomputer 7610 and various interior equipment 7760 existing in the vehicle. The vehicle interior equipment I/F 7660 may establish a wireless connection using a wireless communication protocol such as wireless LAN, Bluetooth (registered trademark), near field communication (NFC), or a wireless USB (WUSB). Furthermore, the vehicle interior equipment I/F 7660 may establish wired connection such as a universal serial bus (USB), a high-definition multimedia interface (HDMI (registered trademark)), or a mobile high-definition link (MHL) via a connection terminal not shown (and a cable if necessary). The vehicle interior equipment 7760 may include, for example, at least one of a mobile device or a wearable device possessed by an occupant, or an information device carried in or attached to the vehicle. Furthermore, the vehicle interior equipment 7760 may include a navigation device that performs a route search to an arbitrary destination. The vehicle interior equipment I/F 7660 exchanges control signals or data signals with these vehicle interior equipment 7760.

The in-vehicle network I/F 7680 is an interface mediating communication between the microcomputer 7610 and the communication network 7010. The in-vehicle network I/F 7680 transmits and receives signals and the like according to a predetermined protocol supported by the communication network 7010.

The microcomputer 7610 of the integrated control unit 7600 controls the vehicle control system 7000 in accordance with various programs on the basis of information acquired via at least one of the general-purpose communication I/F 7620, the dedicated communication I/F 7630, the positioning part 7640, the beacon reception part 7650, the vehicle interior equipment I/F 7660, or the in-vehicle network I/F 7680. For example, the microcomputer 7610 may operate a control target value of the drive force generation device, the steering mechanism, or the braking device on the basis of acquired information inside and outside the vehicle, and output a control command to the drive system control unit 7100. For example, the microcomputer 7610 may perform cooperative control for the purpose of function realization of an advanced driver assistance system (ADAS) including collision avoidance or impact mitigation of the vehicle, follow-up running based on inter-vehicle distance, vehicle speed maintenance running, vehicle collision warning, vehicle lane departure warning, or the like. Furthermore, the microcomputer 7610 may perform cooperative control for the purpose of automatic driving or the like by which a vehicle autonomously runs without depending on the operation of the driver by controlling the drive force generation device, the steering mechanism, the braking device, or the like on the basis of the acquired information on the surroundings of the vehicle.

The microcomputer 7610 may generate three-dimensional distance information between the vehicle and an object such as a surrounding structure or a person on the basis of the information acquired via at least one of the general-purpose communication I/F 7620, the dedicated communication I/F 7630, the positioning part 7640, the beacon reception part 7650, the vehicle interior equipment I/F 7660, or the in-vehicle network I/F 7680, and create local map information including peripheral information on the current position of the vehicle. Furthermore, the microcomputer 7610 may predict danger such as collision of a vehicle, approach of a pedestrian or the like, or entry into a road where traffic is stopped on the basis of acquired information to generate a warning signal. The warning signal may be, for example, a signal for generating an alarm sound or for turning on a warning lamp.

The audio image output part 7670 transmits an output signal of at least one of audio and image to an output device capable of visually or audibly notifying the occupant of the vehicle or the outside of the vehicle, of information. In the example of FIG. 12, as an output device, an audio speaker 7710, a display part 7720, and an instrument panel 7730 are illustrated. The display part 7720 may include at least one of an on-board display or a head-up display, for example. The display part 7720 may have an augmented reality (AR) display function. The output device may be other devices including a wearable device such as a headphone, a spectacular display worn by an occupant, a projector, a lamp, or the like other than these devices. In a case where the output device is a display device, the display device visually displays the result obtained by the various processing performed by the microcomputer 7610 or the information received from the other control unit in various formats such as text, image, table, or graph. Furthermore, in a case where the output device is an audio output device, the audio output device converts an audio signal including reproduced audio data, acoustic data, or the like into an analog signal, and outputs the result audibly.

Note that, in the example shown in FIG. 12, at least two control units connected via the communication network 7010 may be integrated as one control unit. Alternatively, each control unit may be constituted by a plurality of control units. Moreover, the vehicle control system 7000 may include another control unit not shown. Furthermore, in the above description, some or all of the functions carried out by any one of the control units may be performed by the other control unit. That is, as long as information is transmitted and received via the communication network 7010, predetermined operation processing may be performed by any control unit. Similarly, a sensor or device connected to any of the control units may be connected to another control unit, and a plurality of control units may transmit and receive detection information to and from each other via the communication network 7010.

In the vehicle control system 7000 described above, the present technology can be applied to the vehicle exterior information detection unit 7400 or the imaging part 7410 shown in FIG. 12 or the imaging parts 7910, 7912, 7914, 7916, and 7918 shown in FIG. 13. For example, the vehicle exterior information detection unit 7400 is provided with the color space conversion part 11, the gain setting part 12, the gain adjustment part 14, the color space inverse conversion part 15, the correction processing part 16, the image quality adjustment part 17, and the video signal generation part 18 according to the present technology. In this case, the difference in the dynamic range of the imaging part 7410 is large, and even when the light amount of the subject is large, the video signal can be generated with little influence due to the difference in the dynamic range. Furthermore, if the present technology is applied to the imaging parts 7410, 7910, 7912, 7914, 7916, and 7918, a video signal can be output from the imaging part with little influence due to a difference in dynamic range even when the light amount of the subject is large. Therefore, for example, the visual recognition of the subject outside the vehicle becomes easy, and the fatigue of the driver and the like can be reduced. Furthermore, it is possible to acquire information required for automatic driving and the like with high accuracy.

4-2. Application Example to Endoscopic Surgery System

For example, the technology according to the present disclosure may be applied to an endoscopic operating system.

Figure 14:
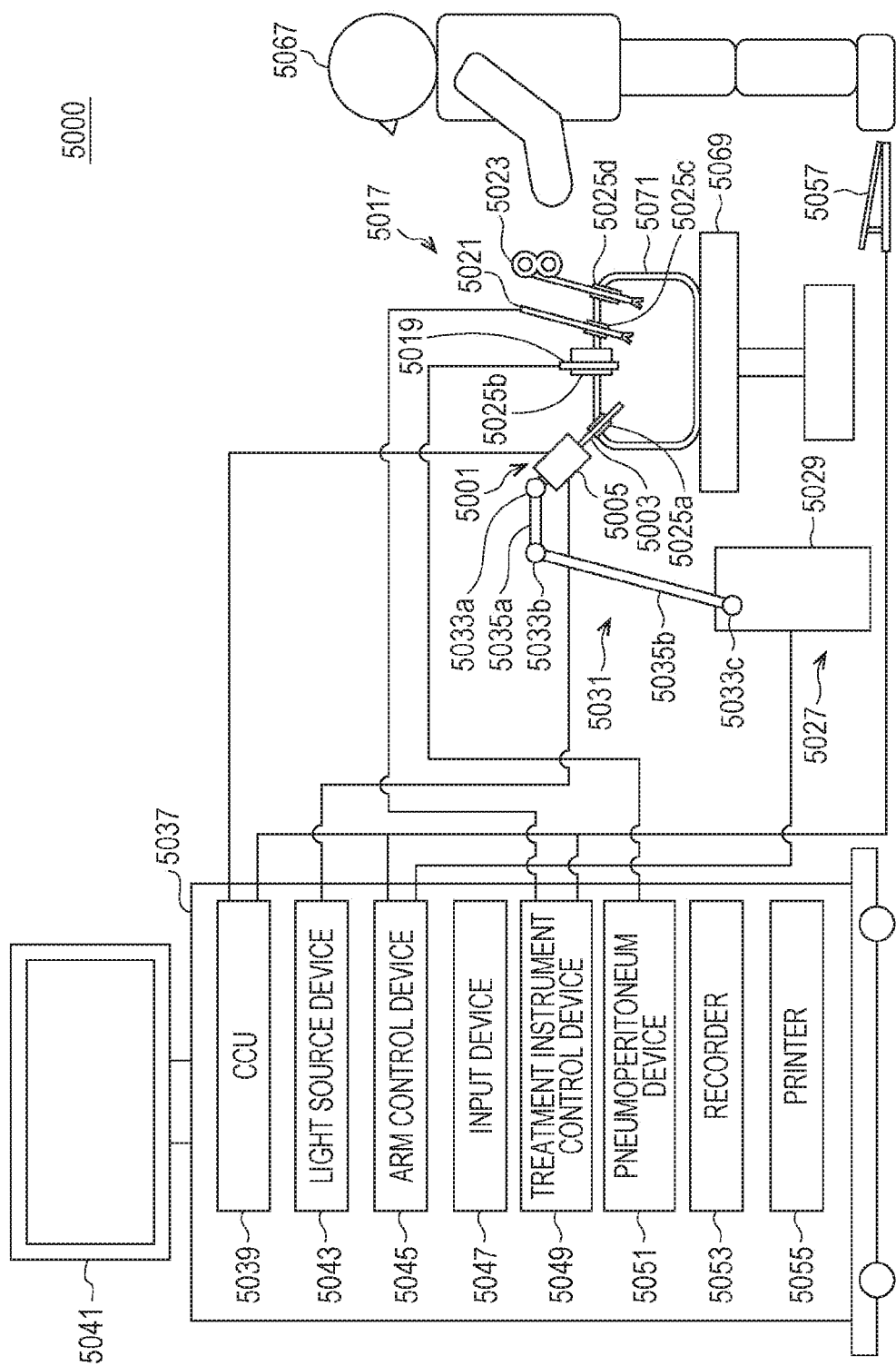
FIG. 14 is a diagram showing an example of a schematic configuration of an endoscopic surgery system.

FIG. 14 is a diagram showing an example of a schematic configuration of an endoscopic surgery system 5000 to which the technology according to the present disclosure can be applied. FIG. 14 shows a situation where a surgeon (physician) 5067 performs surgery on a patient 5071 on a patient bed 5069 using an endoscopic surgery system 5000. As shown in the drawing, the endoscopic surgery system 5000 includes an endoscope 5001, other surgical tools 5017, a support arm device 5027 that supports the endoscope 5001, and a cart 5037 on which various devices for endoscopic surgery are mounted.

In endoscopic surgery, instead of cutting and opening the abdominal wall, a plurality of cylindrical opening tools called trocars 5025a to 5025d is punctured in the abdominal wall. Then, a lens barrel 5003 of the endoscope 5001 and other surgical tools 5017 are inserted into the body cavity of the patient 5071 from the trocars 5025a to 5025d. In the illustrated example, an insufflation tube 5019, an energy treatment instrument 5021, and a forceps 5023 are inserted into the body cavity of the patient 5071 as the other surgical tools 5017. Furthermore, the energy treatment instrument 5021 is a treatment tool that performs incision and peeling of tissue, sealing of a blood vessel, and the like by high-frequency current or ultrasonic vibration. However, the illustrated surgical tool 5017 is merely an example, and various surgical tools generally used in endoscopic surgery, such as forceps and retractors, may be used as the surgical tool 5017, for example.

An image of the surgical site in the body cavity of the patient 5071 taken by the endoscope 5001 is displayed on the display device 5041. The surgeon 5067 performs a treatment such as excision of the affected part using the energy treatment instrument 5021 and the forceps 5023 while viewing the image of the surgical site displayed on the display device 5041 in real time. Note that, although illustration is omitted, the insufflation tube 5019, the energy treatment instrument 5021, and the forceps 5023 are supported by the surgeon 5067, an assistant, or the like during the operation.

(Support Arm Device)

The support arm device 5027 includes an arm 5031 extending from a base 5029. In the illustrated example, the arm 5031 includes joints 5033a, 5033b, and 5033c, and links 5035a and 5035b, and is driven by control from an arm control device 5045. The endoscope 5001 is supported by the arm 5031, and its position and posture are controlled. As a result, stable position fixation of the endoscope 5001 can be achieved.

(Endoscope)

The endoscope 5001 includes a lens barrel 5003 in which a region of a predetermined length from the distal end is inserted into the body cavity of the patient 5071, and a camera head 5005 connected to the proximal end of the lens barrel 5003. In the illustrated example, the endoscope 5001 formed as a so-called rigid mirror having a rigid lens barrel 5003 is illustrated. However, the endoscope 5001 may be formed as a so-called flexible mirror having a flexible lens barrel 5003.

At the tip of the lens barrel 5003, an opening portion into which an objective lens is fitted is provided. The light source device 5043 is connected to the endoscope 5001 and light generated by the light source device 5043 is guided to the distal end of the lens barrel by a light guide extending inside the lens barrel 5003, and is emitted toward the observation target in the body cavity of the patient 5071 via the objective lens. Note that the endoscope 5001 may be a direct view mirror, a perspective mirror, or a side view mirror.

An optical system and an imaging element are provided inside the camera head 5005, and reflected light (observation light) from the observation target is collected to the imaging element by the optical system. The observation light is photoelectrically converted by the imaging element, and an electrical signal corresponding to the observation light, that is, an image signal corresponding to the observation image is generated. The image signal is transmitted as RAW data to a camera control unit (CCU) 5039. Note that the camera head 5005 has a function of adjusting the magnification and the focal length by appropriately driving the optical system.

Note that, for example, in order to cope with stereoscopic vision (3D display) or the like, a plurality of imaging elements may be provided in the camera head 5005. In this case, a plurality of relay optical systems is provided inside the lens barrel 5003 in order to guide observation light to each of the plurality of imaging elements.

(Various Devices Installed in Cart)

The CCU 5039 includes a central processing unit (CPU) or graphics processing unit (GPU), or the like, and centrally controls operation of the endoscope 5001 and the display device 5041. Specifically, the CCU 5039 performs various image processing for display of the image based on the image signal, such as, development processing (demosaic processing), for example, for the image signal received from the camera head 5005. The CCU 5039 provides the display device 5041 with the image signal subjected to the image processing. Furthermore, the CCU 5039 transmits a control signal to the camera head 5005 to control the driving thereof. The control signal may include information associated with imaging conditions such as magnification and focal length.

The display device 5041 displays the image based on the image signal subjected to image processing by the CCU 5039 under the control of the CCU 5039. For example, in a case where the endoscope 5001 corresponds to high-resolution photographing such as 4K (3840 horizontal pixels× 2160 vertical pixels) or 8K (7680 horizontal pixels×4320 vertical pixels), and/or 3D display, a device capable of high-resolution display and/or a device capable of 3D display corresponding to each may be used as the display device 5041. In a case of corresponding to high-resolution photographing such as 4K or 8K, by using the display device 5041 having a size of 55 inches or more, a further immersive feeling can be obtained. Furthermore, a plurality of display devices 5041 having different resolutions and sizes may be provided depending on the application.

The light source device 5043 includes a light source such as a light emitting diode (LED), for example, and supplies irradiation light to the endoscope 5001 in photographing a surgical site or the like.

The arm control device 5045 includes a processor such as a CPU, for example, and operates in accordance with a predetermined program to control the driving of the arm 5031 of the support arm device 5027 according to a predetermined control method.

The input device 5047 is an input interface to the endoscopic surgery system 5000. The user can input various information and input instructions to the endoscopic surgery system 5000 via the input device 5047. For example, the user inputs, via the input device 5047, various types of information related to surgery, such as physical information of a patient and information regarding a surgery procedure. Furthermore, for example, the user inputs an instruction to drive the arm 5031, an instruction to change the imaging conditions (type of irradiated light, magnification, focal length, or the like) by the endoscope 5001, an instruction to drive the energy treatment instrument 5021, or the like via the input device 5047.

The type of the input device 5047 is not limited, and the input device 5047 may be various known input devices. For example, a mouse, a keyboard, a touch panel, a switch, a foot switch 5057, a lever, and/or the like may be applied as the input device 5047. In a case where a touch panel is used as the input device 5047, the touch panel may be provided on the display surface of the display device 5041.

Alternatively, the input device 5047 is a device mounted by the user, such as a glasses-type wearable device or a head mounted display (HMD), for example, and various types of input are performed according to the user's gesture or line of sight detected by these devices. Furthermore, the input device 5047 includes a camera capable of detecting the motion of the user, and various types of input are performed according to the user's gesture and line of sight detected from the video captured by the camera. Moreover, the input device 5047 includes a microphone capable of picking up the user's voice, and various types of input are performed by audio via the microphone. In this manner, with the configuration of the input device 5047 in which various types of information can be input in a non-contact manner, the user (for example, the surgeon 5067) belonging to the clean area can operate the device belonging to the unclean area in a non-contact manner. Furthermore, since the user can operate the device without releasing his/her hand from the operating tool, the convenience of the user is improved.

The treatment instrument control device 5049 controls driving of the energy treatment instrument 5021 for cauterizing tissue, cutting incisions, sealing blood vessels, or the like. The pneumoperitoneum device 5051 feeds gas into the body cavity of the patient 5071 via the insufflation tube 5019 to inflate the body cavity for the purpose of securing a field of view by the endoscope 5001 and securing a working space of the surgeon. The recorder 5053 is a device capable of recording various kinds of information associated with surgery. The printer 5055 is a device capable of printing various kinds of information associated with surgery in various formats such as text, image, and graph.

The particularly characteristic features of the endoscopic surgery system 5000 will be described in more detail below.

(Support Arm Device)

The support arm device 5027 includes a base 5029 which is a base table and an arm 5031 extending from the base 5029. In the illustrated example, the arm 5031 includes a plurality of joints 5033*a*, 5033*b*, and 5033*c*, and a plurality of links 5035*a* and 5035*b* coupled by the joint 5033*b*. However, in FIG. 14, for simplification, the configuration of the arm 5031 is shown in a simplified manner. In practice, the shape, number and arrangement of the joints 5033*a* to 5033*c* and the links 5035*a* and 5035*b*, the direction of the rotation axis of the joints 5033*a* to 5033*c*, and the like may be appropriately set so that the arm 5031 has a desired degree of freedom. For example, the arm 5031 may be preferably configured to have six or more degrees of freedom. As a result, the endoscope 5001 can be freely moved within the movable range of the arm 5031, so that the lens barrel 5003 of the endoscope 5001 can be inserted into the body cavity of the patient 5071 from a desired direction.

The joints 5033*a* to 5033*c* are provided with an actuator, and the joints 5033*a* to 5033*c* are configured to be rotatable around a predetermined rotation axis by driving the actuators. The driving of the actuator is controlled by the arm control device 5045 to control the rotation angles of the joints 5033*a* to 5033*c*, and control the driving of the arm 5031. As a result, control of the position and posture of the endoscope 5001 can be achieved. At this time, the arm control device 5045 can control the driving of the arm 5031 by various known control methods such as force control or position control.

For example, when the surgeon 5067 appropriately inputs operation via the input device 5047 (including the foot switch 5057), the driving of the arm 5031 may be appropriately controlled by the arm control device 5045 according to the operation input, and the position and posture of the endoscope 5001 may be controlled. According to the control, after the endoscope 5001 at the tip of the arm 5031 is moved from an arbitrary position to an arbitrary position, the endoscope 5001 can be fixedly supported at the position after the movement. Note that the arm 5031 may be operated by a so-called master slave method. In this case, the arm 5031 can be remotely controlled by the user via the input device 5047 installed at a location distant from the operating room.

Furthermore, in a case where force control is applied, the arm control device 5045 may perform so-called power assist control for driving actuator of each of joints 5033*a* to 5033*c* so that the external force from the user is received and the arm 5031 moves smoothly following the external force. As a result, when the user moves the arm 5031 while directly touching the arm 5031, the arm 5031 can be moved with a relatively light force. Accordingly, it is possible to move the endoscope 5001 more intuitively and with a simpler operation, and the convenience of the user can be improved.

Here, in general, in endoscopic surgery, the endoscope 5001 is supported by a doctor called scopist. On the other hand, by using the support arm device 5027, the position of the endoscope 5001 can be more reliably fixed without manual operation, so that it is possible to stably acquire an image of the surgical site, and the operation can be performed smoothly.

Note that the arm control device 5045 may not necessarily be provided in the cart 5037. Furthermore, the arm control device 5045 may not necessarily be one device. For example, the arm control device 5045 may be provided at each of the joints 5033*a* to 5033*c* of the arm 5031 of the support arm device 5027, and the plurality of the arm control devices 5045 may cooperate with each other to control the driving of the arm 5031.

(Light Source Device)

The light source device 5043 supplies the endoscope 5001 with illumination light for photographing the surgical site. The light source device 5043 includes, for example, a white light source including an LED, a laser light source, or a combination thereof. At this time, in a case where the white light source is configured by the combination of the RGB laser light sources, since the output intensity and the output timing of each color (each wavelength) can be controlled with high accuracy, adjustment of the white balance of the captured image by the light source device 5043 can be performed. Furthermore, in this case, the laser light from each of the RGB laser light sources is emitted to the observation target in time division and driving of the imaging element of the camera head 5005 is controlled in synchronization with the emission timing, so that it is possible to image images corresponding to each of RGB in time division. According to this method, a color image can be obtained without providing a color filter in the imaging element.

Furthermore, the light source device 5043 may be caused to change the intensity of light to be output at predetermined time intervals. The driving of the imaging element of the camera head 5005 is controlled in synchronization with the timing of the change of the intensity of the light, images are obtained in time division, and the images are combined, so that it is possible to generate a high dynamic image in which so-called halation and black defects do not exist.

Furthermore, the light source device 5043 may be configured to be capable of supplying light of a predetermined wavelength band corresponding to special light observation. In the special light observation, for example, the wavelength dependence of light absorption in the body tissue is utilized, and narrow band light compared with irradiation light at the time of ordinary observation (in other words, white light) is emitted, so that photographing a predetermined tissue such as a blood vessel in the mucosal surface layer with high contrast, so-called narrow-band light observation (narrow band imaging), is performed. Alternatively, in the special light observation, fluorescence observation for obtaining an image by fluorescence generated by emitting excitation light may be performed. In the fluorescence observation, it is possible to irradiate a body tissue with excitation light to observe the fluorescence from the body tissue (autofluorescence observation), or to inject a reagent such as indocyanine green (ICG) to the body tissue and irradiate the body tissue with excitation light corresponding to the fluorescence wavelength of the reagent to obtain a fluorescent image, for example. The light source device 5043 can be configured to be able to supply narrow-band light and/or excitation light corresponding to such special light observation.

(Camera Head and CCU)

Figure 15:
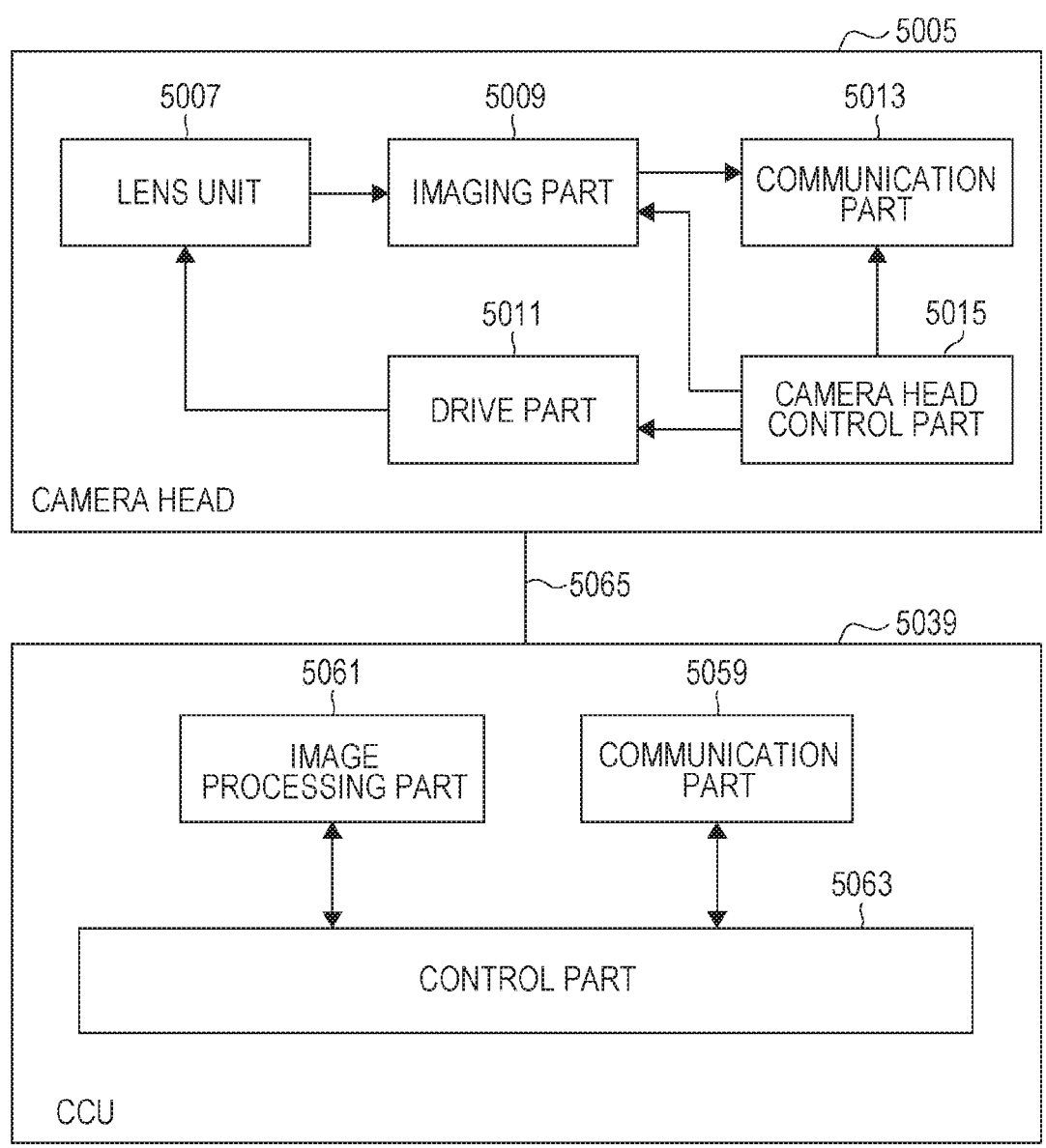
FIG. 15 is a block diagram showing an example of a functional configuration of a camera head and a CCU.

The functions of the camera head 5005 and the CCU 5039 of the endoscope 5001 will be described in more detail with reference to FIG. 15. FIG. 15 is a block diagram showing an example of a functional configuration of the camera head 5005 and the CCU 5039 shown in FIG. 14.

Referring to FIG. 15, the camera head 5005 has a lens unit 5007, an imaging part 5009, a drive part 5011, a communication part 5013, and a camera head control part 5015 as its functions. Furthermore, the CCU 5039 also has a communication part 5059, an image processing part 5061, and a control part 5063 as its functions. The camera head 5005 and the CCU 5039 are bidirectionally communicably connected to each other by a transmission cable 5065.

First, the functional configuration of the camera head 5005 will be described. The lens unit 5007 is an optical system provided at a connecting portion with the lens barrel 5003. The observation light taken in from the distal end of the lens barrel 5003 is guided to the camera head 5005 and is incident on the lens unit 5007. The lens unit 5007 is configured by combining a plurality of lenses including a zoom lens and a focus lens. The optical characteristic of the lens unit 5007 is adjusted so as to condense the observation light on the light receiving surface of the imaging element of the imaging part 5009. Furthermore, the zoom lens and the focus lens are configured such that the position on the optical axis can be moved in order to adjust the magnification and the focus of the captured image.

The imaging part 5009 includes an imaging element, and is arranged in the subsequent stage of the lens unit 5007. The observation light which has passed through the lens unit 5007 is condensed on the light receiving surface of the imaging element, and an image signal corresponding to the observation image is generated by photoelectric conversion. The image signal generated by the imaging part 5009 is provided to the communication part 5013.

As an imaging element included in the imaging part 5009, for example, an image sensor of a complementary metal oxide semiconductor (CMOS) type having Bayer arrangement and capable of color photographing is used. Note that, as the imaging element, for example, an imaging element capable of corresponding to photographing of the high resolution image of 4K or more may be used. By acquiring a high resolution image of the surgical site, the surgeon 5067 can grasp the situation of the surgical site in more detail, and can proceed the surgery more smoothly.

Furthermore, the imaging element included in the imaging part 5009 has a pair of imaging elements for acquiring right-eye and left-eye image signals corresponding to 3 dimensional (3D) display, respectively. By the 3D display, the surgeon 5067 can grasp the depth of a living tissue in the surgical site more accurately. Note that, in a case where the imaging part 5009 is formed in a multiple plate type, a plurality of lens units 5007 can be provided corresponding to each imaging element.

Furthermore, the imaging part 5009 is not necessarily provided in the camera head 5005. For example, the imaging part 5009 may be provided inside the lens barrel 5003 immediately after the objective lens.

The drive part 5011 includes an actuator and moves the zoom lens and the focus lens of the lens unit 5007 by a predetermined distance along the optical axis under the control of the camera head control part 5015. As a result, the magnification and the focus of the captured image by the imaging part 5009 can be appropriately adjusted.

The communication part 5013 includes a communication device for transmitting and receiving various kinds of information to and from the CCU 5039. The communication part 5013 transmits the image signal acquired from the imaging part 5009 as RAW data to the CCU 5039 via the transmission cable 5065. At this time, it is preferable that the image signal be transmitted by optical communication in order to display the captured image of the surgical site with low latency. This is because, during the operation, the surgeon 5067 performs the operation while observing the condition of the affected part by the captured image, and for safer and more reliable operation, it is required that the moving image of the surgical site is displayed in real time as much as possible. In a case where optical communication is performed, the communication part 5013 is provided with a photoelectric conversion module which converts an electrical signal into an optical signal. The image signal is converted into an optical signal by the photoelectric conversion module, and then transmitted to the CCU 5039 via the transmission cable 5065.

Furthermore, the communication part 5013 receives a control signal for controlling driving of the camera head 5005 from the CCU 5039. The control signal may include, for example, information associated with imaging conditions such as information that a frame rate of the imaging image is designated, information that an exposure value at the time of imaging is designated, and/or information that the magnification and focus of the captured image is designated. The communication part 5013 provides the received control signal to the camera head control part 5015. Note that the control signal from the CCU 5039 may also be transmitted by optical communication. In this case, the communication part 5013 is provided with a photoelectric conversion module that converts an optical signal into an electrical signal, and the control signal is converted into an electrical signal by the photoelectric conversion module and is then provided to the camera head control part 5015.

Note that imaging conditions such as the frame rate, the exposure value, the magnification, and the focus described above are automatically set by the control part 5063 of the CCU 5039 on the basis of the acquired image signal. That is, the so-called auto exposure (AE) function, the auto focus (AF) function, and the auto white balance (AWB) function are installed in the endoscope 5001.

The camera head control part 5015 controls driving of the camera head 5005 on the basis of the control signal from the CCU 5039 received via the communication part 5013. For example, the camera head control part 5015 controls driving of the imaging element of the imaging part 5009 on the basis of the information to designate the frame rate of the captured image and/or the information to designate the exposure at the time of imaging. Furthermore, for example, the camera head control part 5015 appropriately moves the zoom lens and the focus lens of the lens unit 5007 via the drive part 5011 on the basis of the information to designate the magnification and the focus of the captured image. The camera head control part 5015 may further have a function of storing information for identifying the lens barrel 5003 and the camera head 5005.

Note that, by arranging the configuration such as the lens unit 5007, the imaging part 5009, or the like in a sealed structure having high airtightness and waterproofness, the camera head 5005 can have resistance to autoclave sterilization.

Next, the functional configuration of the CCU 5039 will be described. The communication part 5059 includes a communication device for transmitting and receiving various kinds of information to and from the camera head 5005. The communication part 5059 receives an image signal transmitted from the camera head 5005 via the transmission cable 5065. At this time, as described above, the image signal can be preferably transmitted by optical communication. In this case, in accordance with the optical communication, the communication part 5059 is provided with a photoelectric conversion module which converts an optical signal into an electrical signal. The communication part 5059 provides the image processing part 5061 with the image signal converted into the electrical signal.

Furthermore, the communication part 5059 transmits a control signal for controlling driving of the camera head 5005 to the camera head 5005. The control signal may also be transmitted by optical communication.

The image processing part 5061 performs various image processing on the image signal which is RAW data transmitted from the camera head 5005. Examples of the image processing include various known signal processing such as development processing, high image quality processing (band enhancement processing, super-resolution processing, noise reduction (NR) processing, and/or camera blur correction processing, for example), and/or enlargement processing (electronic zoom processing). Furthermore, the image processing part 5061 also performs detection processing on the image signal to perform AE, AF, and AWB.

The image processing part 5061 includes a processor such as a CPU or a GPU, and may perform the image processing and the detection processing described above by the processor operating according to a predetermined program. Note that, in a case where the image processing part 5061 includes a plurality of GPUs, the image processing part 5061 appropriately divides the information related to the image signal, and performs image processing in parallel by the plurality of GPUs.

The control part 5063 performs various types of control regarding imaging of the surgical site by the endoscope 5001 and display of the captured image. For example, the control part 5063 generates a control signal for controlling driving of the camera head 5005. At this time, in a case where the imaging condition is input by the user, the control part 5063 generates a control signal on the basis of the input by the user. Alternatively, in a case where the endoscope 5001 is equipped with the AE function, the AF function, and the AWB function, the control part 5063 calculates the optimum exposure value, focal length, and the white balance appropriately according to the result of the detection processing by the image processing part 5061, to generate a control signal.

Furthermore, the control part 5063 causes the display device 5041 to display the captured image including a surgical site or the like on the basis of the image signal subjected to the image processing by the image processing part 5061. In this case, the control part 5063 recognizes various objects in the surgical site image using various image recognition techniques. For example, the control part 5063 can recognize a surgical tool such as a forceps, a specific body part, bleeding, a mist at the time of using the energy treatment instrument 5021, or the like by detecting the shape, color, or the like of the edge of the object included in the surgical site image. When causing the display device 5041 to display the surgical site image, the control part 5063 causes various surgical operation support information to be superimposed and displayed on the image of the surgical site using the recognition result. The surgical operation support information is superimposed and displayed, and presented to the surgeon 5067, so that the operation can proceed safely and reliably.

The transmission cable 5065 connecting the camera head 5005 and the CCU 5039 is an electric signal cable corresponding to communication of electrical signals, an optical fiber corresponding to optical communication, or a composite cable thereof.

Here, in the example shown in the drawing, communication is performed by wire using the transmission cable 5065. However, communication between the camera head 5005 and the CCU 5039 may be performed wirelessly. In a case where the communication between the two is performed wirelessly, it is not necessary to lay the transmission cable 5065 in the operating room, so that a situation can be solved where the movement of the medical staff in the operating room is disturbed by the transmission cable 5065.

An example of the endoscopic surgery system 5000 to which the technology according to the present disclosure can be applied has been described above. Note that, although the endoscopic surgery system 5000 has been described as an example here, the system to which the technology according to the present disclosure can be applied is not limited to such an example. For example, the technology according to the present disclosure may be applied to an inspection flexible endoscope system or a microscopic surgery system.

In the endoscopic surgery system 5000 described above, the present technology can be applied to the CCU 5039 shown in FIG. 14 and the image processing part 5061 shown in FIG. 15. For example, the CCU 5039 and the image processing part 5061 are provided with the color space conversion part 11, the gain setting part 12, the gain adjustment part 14, the color space inverse conversion part 15, the correction processing part 16, the image quality adjustment part 17, and the video signal generation part 18 according to the present technology. In this case, the difference in the dynamic range of the endoscope 5001 and the imaging part 5009 is large, and even when the light amount of the subject is high, the video signal can be generated with little influence of the difference in the dynamic range. For this reason, for example, the surgeon can easily check the state of the surgical site and the like. Note that, although an endoscopic surgery system has been described as an example here, the technology according to the present disclosure may also be applied to, for example, a microscopic surgery system or the like.

The series of processing described in the specification can be performed by hardware, software, or a combined configuration of both. In a case of performing processing by software, the program in which the processing sequence is recorded can be installed in a memory in a computer incorporated in dedicated hardware and executed. Alternatively, the program can be installed on a general-purpose computer capable of executing various processes and executed.

For example, the program can be recorded in a hard disk, a solid state drive (SSD), or a read only memory (ROM) as a recording medium in advance. Alternatively, the program can be temporarily or permanently stored (recorded) in a removable recording medium such as a flexible disk, a compact disc read only memory (CD-ROM), a magneto optical (MO) disk, a digital versatile disc (DVD), a Blu-Ray Disc (BD) (registered trademark), a magnetic disk, or a semiconductor memory card. Such a removable recording medium can be provided as so-called package software.

Furthermore, in addition to being installed on a computer from a removable recording medium, the program may be transferred wirelessly or by wire from a download site to the computer via a network such as a local area network (LAN) or the Internet. The computer can receive the program transferred in this way and install the program on a recording medium such as a built-in hard disk.

Note that the effects described in this specification are merely examples, and the present invention is not limited thereto, and may have additional effects that are not described. Furthermore, the present technology should not be construed as being limited to the embodiments of the technology described above. Embodiments of the present technology disclose the present technology in a form of illustration, and it is obvious that those skilled in the art can modify or substitute the embodiments without departing from the gist of the present technology. That is, in order to determine the gist of the present technology, the scope of claims should be taken into consideration.

Furthermore, the signal processing device of the present technology can also adopt the following configuration.

(1) A signal processing device including: a gain setting part that sets a gain for a color signal obtained by performing color space conversion of converting an input signal into a luminance signal and the color signal, according to a setting reference signal based on the input signal; and a gain adjustment part that performs gain adjustment of the color signal using the gain set by the gain setting part.

(2) The signal processing device according to (1), in which the input signal is a signal for each color component obtained by performing imaging using a color separation filter.

(3) The signal processing device according to (2), in which the gain setting part uses the luminance signal obtained by performing the color space conversion as the setting reference signal, and performs gain setting so that saturation of a subject indicated by the input signal is reduced in a case where the setting reference signal is larger than a threshold.

(4) The signal processing device according to (3), in which the gain setting part uses the luminance signal obtained by performing the color space conversion as the setting reference signal, and performs gain setting so that the subject indicated by the input signal approaches an achromatic color in a case where the setting reference signal is larger than the threshold.

(5) The signal processing device according to (4), in which, in a case where the setting reference signal is larger than a first threshold and smaller than a second threshold larger than the first threshold, the gain setting part performs gain setting so that the saturation of the subject decreases as a signal level of the setting reference signal increases, and in a case where the setting reference signal is equal to or larger than the second threshold, the gain setting part performs gain setting so that the subject indicated by the input signal is achromatic.

(6) The signal processing device according to (5), in which the first threshold is equal to or smaller than a smallest value in a dynamic range for the each color component.

(7) The signal processing device according to (2), in which the signal for the each color component is a three primary color component signal, and the gain setting part sets the setting reference signal on the basis of one or a plurality of color component signals selected from the input signal, and, in a case where the setting reference signal is larger than a threshold, the gain setting part performs gain setting so that the subject indicated by the input signal is achromatic.

(8) The signal processing device according to (7), in which the gain setting part sets a color component signal having a smallest dynamic range from the input signal as the setting reference signal.

(9) The signal processing device according to (7) or (8), in which the gain setting part performs gain setting so that, in a case where the setting reference signal is larger than the threshold, all other color component signals different from the setting reference signal are smaller than the setting reference signal, and in a case where the setting reference signal is equal to or smaller than the threshold, gain adjustment of the color component signal is not performed.

(10) The signal processing device according to any one of (7) to (9), in which, in a case where the setting reference signal is larger than the threshold, and all other color component signals different from the setting reference signal are equal to or larger than the setting reference signal, the gain setting part performs gain setting so that the subject indicated by the input signal is achromatic.

(11) The signal processing device according to any one of (7) to (10), in which, in a case where the color component signal having the smallest dynamic range in the input signal is larger than the threshold, and only one of the other color component signals different from the setting reference signal is equal to or larger than the color component signal having the smallest dynamic range, the gain setting part generates the setting reference signal using the color component signal having the smallest dynamic range and the other color component signals from the input signal.

(12) The signal processing device according to any one of (1) to (11) further including:

a color space conversion part that performs color space conversion of the input signal for the each color component to generate the luminance signal and the color signal; and a color space inverse conversion part that performs color space conversion of the luminance signal and the color signal subjected to gain adjustment in the gain adjustment part, and generates an output signal of a color space equal to the input signal.

INDUSTRIAL APPLICABILITY

According to the signal processing device, the signal processing method, and the imaging device of this technology, a gain is set for a color signal obtained by performing color space conversion of converting an input signal into a luminance signal and the color signal, according to a setting reference signal based on the input signal, and gain adjustment of the color signal is performed using the gain that has been set. For this reason, even in a case where the light amount of the subject is high, the influence of the difference in the dynamic range can be made little. Therefore, the present technology is suitable for an imaging device, a device that performs signal processing of an image signal generated by the imaging device, and the like.

REFERENCE SIGNS LIST

10, 10-1, 10-2 Signal processing device
11 Color space conversion part
12, 13 Gain setting part
13a Setting reference signal generation part
13b Gain setting processing part
14 Gain adjustment part
15 Color space inverse conversion part
16 Correction processing part
17 Image quality adjustment part
18 Video signal generation part

The invention claimed is:

1. A signal processing device, comprising:

a gain setting part configured to set, based on a setting reference signal, a gain for a color signal obtained by color space conversion of an input signal into a luminance signal and the color signal wherein the setting reference signal is based on the input signal, in a case where the setting reference signal is larger than a first threshold and smaller than a second threshold larger than the first threshold, the gain of the color signal is set so that a saturation of a subject indicated by the input signal decreases as a signal level of the setting reference signal increases, and in a case where the setting reference signal is equal to or larger than the second threshold, the gain is set so that the subject indicated by the input signal is achromatic; and a gain adjustment part configured to perform gain adjustment of the color signal based on the gain set by the gain setting part.

2. The signal processing device according to claim 1, wherein the input signal is a signal for each color component of a plurality of color components obtained by an imaging operation using a color separation filter.

3. The signal processing device according to claim 2, wherein the gain setting part is further configured to use the luminance signal as the setting reference signal.

4. The signal processing device according to claim 2, wherein the first threshold is equal to one of a dynamic range of a color component of the plurality of color components or a value smaller than the dynamic range of the color component, and the dynamic range of the color component is smallest in the plurality of color components.

5. The signal processing device according to claim 2, wherein the signal for each color component of the plurality of color components is a three primary color component signal, the gain setting part is further configured to set the setting reference signal based on at least one color component signal of a plurality of color component signals selected from the input signal, and in a case where the setting reference signal is larger than the first threshold, the gain setting part is further configured to set the gain so that the subject indicated by the input signal is achromatic.

6. The signal processing device according to claim 5, wherein the gain setting part is further configured to set, as the setting reference signal, a first color component signal having a smallest dynamic range among the plurality of color component signals.

7. The signal processing device according to claim 6, wherein the gain setting part is further configured to set the gain so that, in a case where the setting reference signal is larger than the first threshold, and second color component signals of the plurality of color component signals different from the setting reference signal are smaller than the setting reference signal, and in a case where the setting reference signal is equal to or smaller than the first threshold, the gain adjustment of the color signal is not performed.

8. The signal processing device according to claim 6, wherein, in a case where the setting reference signal is larger than the first threshold, and second color component signals of the plurality of color component signals different from the setting reference signal are equal to or larger than the setting reference signal, the gain setting part is further configured to set the gain so that the subject indicated by the input signal is achromatic.

9. The signal processing device according to claim 5, wherein, in a case where a first color component signal having a smallest dynamic range among the plurality of color component signals is larger than the first threshold, and only one of second color component signals of the plurality of color component signals different from the setting reference signal is equal to or larger than the first color component signal having the smallest dynamic range, the gain setting part is further configured to generate the setting reference signal based on the first color component signal having the smallest dynamic range and the second color component signals.

10. The signal processing device according to claim 1, further comprising:
a color space conversion part configured to perform the color space conversion of the input signal for each color component of a plurality of color components to generate the luminance signal and the color signal; and
a color space inverse conversion part configured to:
perform color space conversion of the luminance signal and the color signal subjected to the gain adjustment in the gain adjustment part, and
generate an output signal of a color space equal to the input signal based on the color space conversion of the luminance signal and the color signal subjected to the gain adjustment.

11. An imaging device, comprising:
a color space conversion part configured to:
perform color space conversion of a plurality of color component signals generated by an imaging part, and
generate, based on the color space conversion, a luminance signal and a color signal different from the plurality of color component signals;
a gain setting part configured to:
set a setting reference signal based on at least one color component signal of the plurality of color component signals selected from an input signal, and
set, in a case where the setting reference signal is larger than a threshold, a gain of the color signal so that a subject indicated in the input signal is achromatic, wherein
the input signal is a signal for each color component of a plurality of color components obtained by an imaging operation using a color separation filter, and
the signal for each color component of the plurality of color components is a three primary color component signal; and
a gain adjustment part configured to perform gain adjustment of the color signal based on the gain set by the gain setting part.

12. The imaging device according to claim 11, further comprising the imaging part configured to execute the imaging operation using the color separation filter and generate the three primary color component signal.

13. The imaging device according to claim 11, further comprising a video signal generation part configured to generate a video signal based on the color signal after the gain adjustment.

14. A signal processing device, comprising:
a gain setting part configured to:
set a setting reference signal based on at least one color component signal of a plurality of color component signals selected from an input signal, wherein
the input signal is a signal for each color component of a plurality of color components obtained by an imaging operation using a color separation filter, and
the signal for each color component of the plurality of color components is a three primary color component signal, and
set a gain for a color signal obtained by color space conversion of the input signal into a luminance signal and the color signal, wherein the gain is set so that a subject indicated by the input signal is achromatic in a case where the setting reference signal is larger than a threshold; and
a gain adjustment part configured to perform gain adjustment of the color signal based on the gain set by the gain setting part.

15. The signal processing device according to claim 14, wherein the gain setting part is further configured to set, as the setting reference signal, a color component signal having a smallest dynamic range among the plurality of color component signals.

16. The signal processing device according to claim 14, wherein, in a case where a first color component signal having a smallest dynamic range among the plurality of color component signals is larger than the threshold, and only one of second color component signals of the plurality of color component signals different from the setting reference signal is equal to or larger than the first color component signal having the smallest dynamic range, the gain setting part is further configured to generate the setting reference signal based on the first color component signal having the smallest dynamic range and the second color component signals.

17. The signal processing device according to claim 14, further comprising a color space inverse conversion part configured to:
perform color space conversion of the luminance signal and the color signal subjected to the gain adjustment in the gain adjustment part; and
generate an output signal of a color space equal to the input signal based on the color space conversion of the luminance signal and the color signal subjected to the gain adjustment.

* * * * *